(12) United States Patent
Arai et al.

(10) Patent No.: US 11,092,202 B2
(45) Date of Patent: Aug. 17, 2021

(54) CONTROL APPARATUS FOR VEHICLE DRIVE-FORCE TRANSMITTING APPARATUS

(71) Applicant: TOYOTA JIDOSHA KABUSHIKI KAISHA, Toyota (JP)

(72) Inventors: Shotaro Arai, Okazaki (JP); Atsushi Ayabe, Toyota (JP); Kunio Hattori, Nagoya (JP); Yusuke Ohgata, Miyoshi (JP); Shinji Oita, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 203 days.

(21) Appl. No.: 16/571,247

(22) Filed: Sep. 16, 2019

(65) Prior Publication Data

US 2020/0116212 A1    Apr. 16, 2020

(30) Foreign Application Priority Data

Oct. 16, 2018   (JP) .............................. JP2018-195437

(51) Int. Cl.
*F16D 48/02*     (2006.01)
*F16H 57/04*     (2010.01)
(Continued)

(52) U.S. Cl.
CPC ......... *F16D 48/02* (2013.01); *F16H 57/0489* (2013.01); *F16H 57/0442* (2013.01);
(Continued)

(58) Field of Classification Search
CPC .. F16D 48/02; F16H 57/0489; F16H 57/0442; F16H 2057/0081;
(Continued)

(56) References Cited

U.S. PATENT DOCUMENTS

| 2015/0087463 A1* | 3/2015 | Nakagawa | ............ F16H 37/022 475/201 |
| 2017/0050635 A1* | 2/2017 | Kitahata | ............... B60W 20/50 |

(Continued)

FOREIGN PATENT DOCUMENTS

| CN | 108138927 A | 6/2018 |
| WO | 2013/176208 A1 | 11/2013 |

*Primary Examiner* — Terence Boes
(74) *Attorney, Agent, or Firm* — Oliff PLC

(57) ABSTRACT

A control apparatus for a vehicle drive-force transmitting apparatus which defines a first drive-force transmitting path provided with a first clutch and a two-way clutch and a second drive-force transmitting path provided with a continuously variable transmission and a second clutch. The control apparatus switches the two-way clutch from its lock mode to its one-way mode, when the second drive-force transmitting path is to be established in place of the first drive-force transmitting path. The drive-force transmitting apparatus includes a hydraulic actuator configured to control switching of the two-way clutch between the lock mode and the one-way mode. When a request for establishing the second drive-force transmitting path in place of the first drive-force transmitting path is made during forward running of the vehicle with the two-way clutch being in the lock mode, the control apparatus executes a dither control for fluctuating a hydraulic pressure applied to the hydraulic actuator.

10 Claims, 5 Drawing Sheets

(51) Int. Cl.
  *F16H 61/66* (2006.01)
  *F16H 61/12* (2010.01)
  *F16H 57/00* (2012.01)
  *F16H 61/30* (2006.01)

(52) U.S. Cl.
  CPC ............... *F16H 2057/0081* (2013.01); *F16H 2061/1276* (2013.01); *F16H 2061/302* (2013.01); *F16H 2061/661* (2013.01)

(58) Field of Classification Search
  CPC ....... F16H 2061/1276; F16H 2061/302; F16H 2061/661
  See application file for complete search history.

(56) References Cited

U.S. PATENT DOCUMENTS

| | | | |
|---|---|---|---|
| 2018/0274643 A1* | 9/2018 | Okoshi | F16H 37/021 |
| 2019/0195359 A1* | 6/2019 | Hattori | F16H 61/66272 |
| 2019/0271393 A1* | 9/2019 | Hattori | F16H 61/66259 |
| 2019/0316674 A1* | 10/2019 | Hattori | F16H 9/18 |
| 2020/0114914 A1* | 4/2020 | Kawai | F16D 41/04 |
| 2020/0114915 A1* | 4/2020 | Hattori | B60W 10/06 |
| 2020/0116215 A1* | 4/2020 | Satoh | F16D 48/06 |
| 2020/0116243 A1* | 4/2020 | Fukai | F16D 41/125 |
| 2020/0116257 A1* | 4/2020 | Ayabe | F16D 21/00 |
| 2020/0122729 A1* | 4/2020 | Satoh | F16H 37/0846 |
| 2020/0124171 A1* | 4/2020 | Hattori | F16H 61/0403 |

\* cited by examiner

FIG.4

| | | C1 | C2 | B1 | TWC |
|---|---|---|---|---|---|
| | | \multicolumn{4}{c|}{TABLE} |
| P | | | | | |
| R | | | | ○ | ○ |
| N | | | | | |
| D | (D1) | ○ | | | |
| | (D2) | | ○ | | |
| M | (M1) | ○ | | | ○ |
| | (M2) | | ○ | | |

CONTROL APPARATUS FOR VEHICLE DRIVE-FORCE TRANSMITTING APPARATUS

This application claims priority from Japanese Patent Application No. 2018-195437 filed on Oct. 16, 2018, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus defines first and second drive-force transmitting paths that are provided in parallel with each other between an engine and drive wheels of the vehicle.

BACKGROUND OF THE INVENTION

There is known a drive-force transmitting apparatus that is to be provided in a vehicle having an engine and drive wheels, wherein the drive-force transmitting apparatus defines first and second drive-force transmitting paths that are provided in parallel with each other between the engine and the drive wheels. The first drive-force transmitting path is provided with a first clutch and a dog clutch, and the second drive-force transmitting path is provided with a continuously variable transmission and a second clutch. For example, WO2013/176208 discloses such a drive-force transmitting apparatus. In the disclosed drive-force transmitting apparatus, the first clutch and the dog clutch are controlled to be released and the second clutch is controlled to be engaged when a first state in which a drive force of the engine is transmitted to the drive wheels along the first drive-force transmitting path is to be switched to a second state in which the drive force of the engine is transmitted to the drive wheels along the second drive-force transmitting path.

SUMMARY OF THE INVENTION

By the way, in the drive-force transmitting apparatus disclosed in WO2013/176208, the dog clutch is provided in the first drive-force transmitting path, and is released in a running state of the vehicle that could cause the first clutch to be rotated at a high speed, for restraining the first clutch from being rotated at a high speed. However, the dog clutch is constituted to include components such as a synchromesh mechanism, thereby increasing the number of components and the cost for manufacturing the drive-force transmitting apparatus.

For the purpose of reducing the cost, the dog clutch may be replaced by a two-way clutch which is to be placed in a selected one of a plurality of operation modes that include at least an one-way mode and a lock mode, such that the two-way clutch is configured to transmit a drive force during a driving state of the vehicle and to cut off transmission of the drive force during a driven state of the vehicle when the two-way clutch is placed in the one-way mode, and such that the two-way clutch is configured to transmit the drive force during the driving state of the vehicle and during the driven state of the vehicle when the two-way clutch is placed in the lock mode. Thus, in a running state of the vehicle that could cause the first clutch to be rotated at a high speed, the two-way clutch is placed in the one-way mode whereby transmission of rotation through the two-way clutch to the first clutch is cut off, so that the first clutch can be restrained from being rotated at a high speed.

In the drive-force transmitting apparatus that is constructed as described above, when the vehicle is in the driven state (in which the vehicle is caused to run by an inertia), for example, during an inertia running of the vehicle, the two-way clutch could fail to be switched from the lock mode to the one-way mode due to members of the two-way clutch which are in contact with each other and which apply forces onto each other. If the vehicle running is continued with the two-way clutch being held in the lock mode, the rotation is transmitted to the first clutch through the two-way clutch, so that there is a risk that the first clutch could be rotated at a high speed when the running speed becomes a high speed.

The present invention was made in view of the background art described above. It is therefore an object of the present invention to provide a control apparatus for a drive-force transmitting apparatus that is to be provided in a vehicle having an engine and drive wheels, wherein the drive-force transmitting apparatus defines first and second drive-force transmitting paths that are provided in parallel with each other between the engine and the drive wheels, wherein the first drive-force transmitting path is provided with a first clutch and a two-way clutch and the second drive-force transmitting path is provided with a continuously variable transmission and a second clutch, and wherein the control apparatus is capable of restraining the first clutch from being rotated at a high speed, by facilitating the one-way clutch to be switched to the one-way mode even in a state in which the one-way clutch is difficult to be switched to the one-way mode.

The object indicated above is achieved according to the following aspects of the present invention.

According to a first aspect of the invention, there is provided a control apparatus for a drive-force transmitting apparatus that is to be provided in a vehicle having an engine and drive wheels, wherein the drive-force transmitting apparatus includes a continuously variable transmission, a first clutch, a second clutch and a third clutch, and defines first and second drive-force transmitting paths that are provided in parallel with each other between the engine and the drive wheels, such that the first clutch and the third clutch are provided in the first drive-force transmitting path, and such that the continuously variable transmission and the second clutch are provided in the second drive-force transmitting path, wherein the first drive-force transmitting path is to be established by engagement of the first clutch and release of the second clutch, such that a drive force is to be transmitted along the first drive-force transmitting path through the first clutch and the third clutch when the first drive-force transmitting path is established, wherein the second drive-force transmitting path is to be established by release of the first clutch and engagement of the second clutch, such that the drive force is to be transmitted along the second drive-force transmitting path through the continuously variable transmission and the second clutch when the second drive-force transmitting path is established, wherein the third clutch is a two-way clutch that is to be placed in a selected one of a plurality of operation modes that include at least an one-way mode and a lock mode, such that the two-way clutch is configured to transmit the drive force during a driving state of the vehicle and to cut off transmission of the drive force during a driven state of the vehicle when the two-way clutch is placed in the one-way mode, and such that the two-way clutch is configured to transmit the drive force during the driving state of the vehicle and during the driven state of the vehicle when the two-way clutch is placed in the lock mode, wherein the control apparatus is configured to switch the two-way clutch from the lock mode to the one-way mode, when the second drive-force transmitting path is to be established in place of the first drive-force transmitting path, wherein the drive-force transmitting apparatus includes a hydraulic actuator configured to control switching of the two-way clutch between the lock mode and the one-way mode, and wherein the control apparatus comprises a dither control portion that is configured, when a request for establishing the second drive-force transmitting path in place of the first drive-force transmitting path is made during forward running of the vehicle with the two-way clutch being placed in the lock mode, to execute a dither control for fluctuating a hydraulic pressure applied to the hydraulic actuator by which the switching of the two-way clutch is controlled. It is noted that the feature regarding to the two-way clutch (which is described that the two-way clutch is configured to transmit the drive force during a driving state of the vehicle and to cut off transmission of the drive force during a driven state of the vehicle when the two-way clutch is placed in the one-way mode, and the two-way clutch is configured to transmit the drive force during the driving state of the vehicle and during the driven state of the vehicle when the two-way clutch is placed in the lock mode) may be described alternatively that the two-way clutch includes an input-side rotary portion and an output-side rotary portion such that rotation is to be transmitted between the engine and the input-side rotary portion along the first drive-force transmitting path and such that rotation is to be transmitted between the output-side rotary portion and the drive wheels along the first drive-force transmitting path, wherein the input-side rotary portion is inhibited from being rotated in a predetermined one of opposite directions relative to the output-side rotary portion and is allowed to be rotated in the other of the opposite directions relative to the output-side rotary portion, when the two-way clutch is placed in the one-way mode, and wherein the input-side rotary portion is inhibited from being rotated in both of the opposite directions relative to the output-side rotary portion, when the two-way clutch is placed in the lock mode. Further, the control apparatus may further include a running-state determining portion configured to determine that the vehicle is placed in the driven state when a running speed of the vehicle is not lower than a predetermined speed value and an operation amount of an accelerator pedal of the vehicle is not larger than a predetermined amount value. Still further, the dither control portion may be configured to execute the dither control such that the hydraulic pressure applied to the hydraulic actuator is fluctuated with a predetermined period, for example, wherein the predetermined period, with which the hydraulic pressure is fluctuated, is dependent on a time constant of the hydraulic pressure, such that the predetermined period is longer as the time constant is larger. Moreover, for example, the control apparatus is configured, when the two-way clutch is to be switched from the one-way mode to the lock mode, to cause the hydraulic pressure to be applied to the hydraulic actuator, and is configured, when the two-way clutch is to be switched from the lock mode to the one-way mode, to substantially stop application of the hydraulic pressure to the hydraulic actuator, wherein, in event of an unlock failure in which the two-way clutch is not switched from the lock mode to the one-way mode in spite of substantial stop of the application of the hydraulic pressure to the hydraulic actuator, the dither control portion is configured to execute the dither control by which the hydraulic pressure fluctuated with a predetermined period is applied to the hydraulic actuator. Further, for example, the two-way clutch is provided between the first clutch and the drive wheels in the first drive-force transmitting path.

According to a second aspect of the invention, in the control apparatus according to the first aspect of the invention, the dither control portion is configured to terminate execution of the dither control, when it is determined that the two-way clutch is switched from the lock mode to the one-way mode after start of the execution of the dither control.

According to a third aspect of the invention, in the control apparatus according to the first or second aspect of the invention, the dither control portion is configured to terminate execution of the dither control, when establishment of the second drive-force transmitting path in place of the first drive-force transmitting path is completed.

According to a fourth aspect of the invention, in the control apparatus according to the second aspect of the invention, the two-way clutch includes two rotary portions, which are to be rotated substantially integrally with each other when the drive force is transmitted through the two-way clutch, wherein the dither control portion is configured to determine that the two-way clutch is switched from the lock mode to the one-way mode when a rotational speed difference between a rotational speed of one of the two rotary portions and a rotational speed of the other of the two rotary portions is not smaller than a predetermined threshold value.

In the control apparatus according to the first aspect of the invention, when the request for establishing the second drive-force transmitting path in place of the first drive-force transmitting path is made during forward running of the vehicle with the two-way clutch being placed in the lock mode, the dither control is executed for fluctuating the hydraulic pressure applied to the hydraulic actuator by which the switching of the two-way clutch is controlled. Owing to the execution of the dither control, a force, which is periodically changed or fluctuated by the fluctuation of the hydraulic pressure applied to the hydraulic actuator, is applied to the two-way clutch, the two-way clutch is facilitated to be switched to the one-way mode. Then, with the two-way clutch being switched from the lock mode to the one-way mode owing to the execution of the dither control, rotation transmitted from the drive wheels is blocked by the two-way clutch after the second drive-force transmitting path is established. Thus, the rotation is not transmitted from the drive wheels to the first clutch so that it is possible to restrain the first clutch from being rotated at a high speed.

In the control apparatus according to the second aspect of the invention, when it is determined that the two-way clutch is switched from the lock mode to the one-way mode after start of the execution of the dither control, the execution of the dither control is terminated. Thus, it is possible to avoid a situation in which the dither control is repeatedly executed even after the two-way clutch has been switched to the one-way mode.

In the control apparatus according to the third aspect of the invention, when the establishment of the second drive-force transmitting path in place of the first drive-force transmitting path has been completed, the execution of the dither control is terminated. Thus, it is possible to avoid change of the drive force, which could be caused in a situation in which the dither control is executed continuously even after the second drive-force transmitting path has been established in place of the first drive-force transmitting path.

In the control apparatus according to the fourth aspect of the invention, the determination as to whether the two-way clutch has been switched to the one-way mode or not can be easily made based on the rotational speed difference between the rotational speeds of the respective two rotary portions included in the two-way clutch.

BRIEF DESCRIPTION OF THE DRAWINGS

FIG. 4 is a table indicating an operation state of each of engagement devices for each of operation positions which is selected by operation of a manually-operated shifting device in the form of a shift lever that is provided in the vehicle;

DETAILED DESCRIPTION OF PREFERRED EMBODIMENT

Hereinafter, a preferred embodiment of the invention will be described in detail with reference to the accompanying drawings.

It is noted that the figures of the drawings are simplified or deformed as needed, and each portion is not necessarily precisely depicted in terms of dimension ratio, shape, etc.

Embodiment

Figure 1:
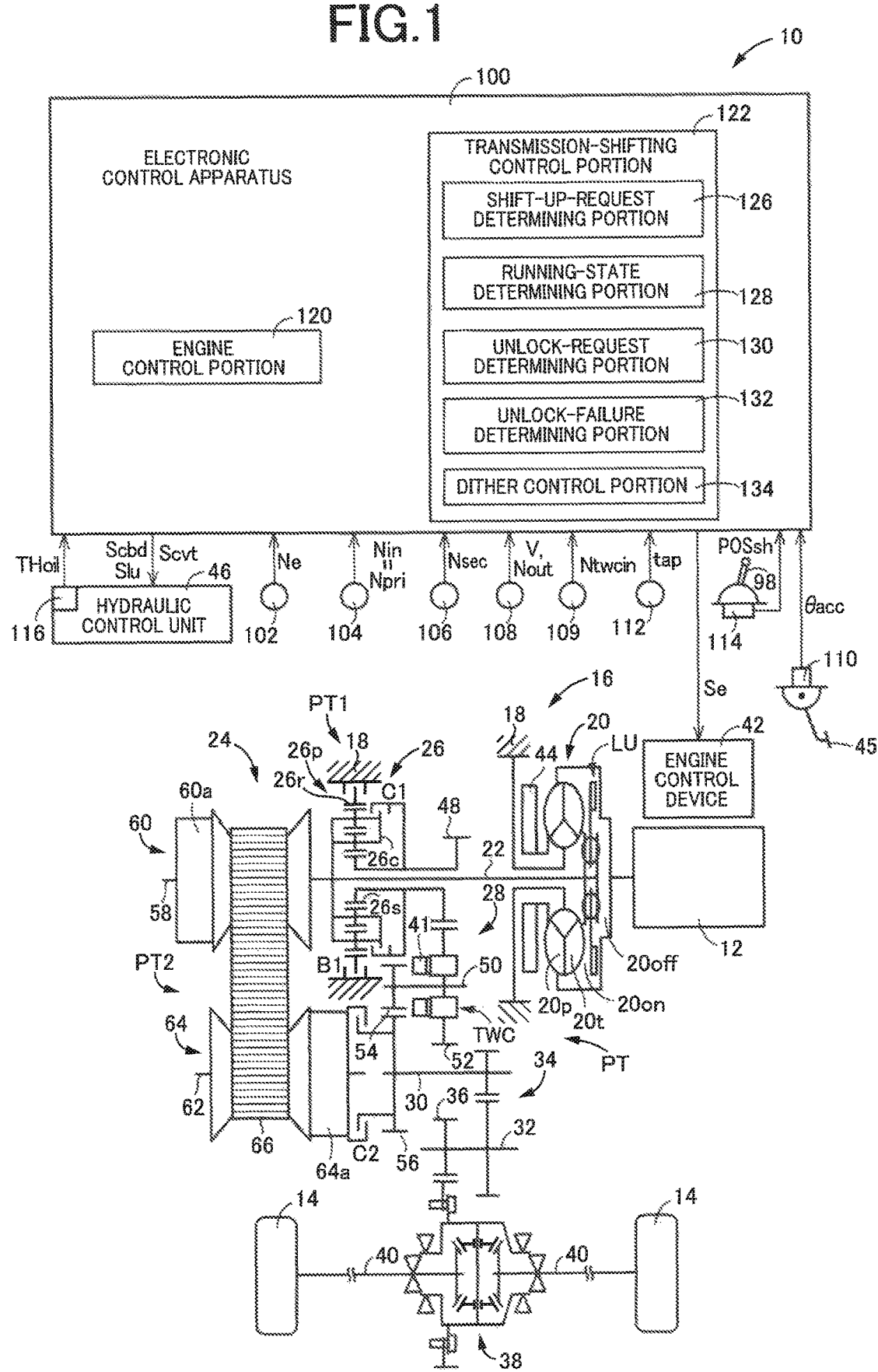
FIG. 1 is a schematic view showing a construction of a vehicle to be controlled by an electronic control apparatus according to the present invention, and major control functions and control portions of the control apparatus.

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a vehicle drive-force transmitting apparatus 16 that is configured to transmit the drive force of the engine 12 to the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a belt-type continuously variable transmission 24 connected to the input shaft 22, a forward/reverse switching device 26 connected to the input shaft 22, a gear mechanism 28 which is provided in parallel with the continuously variable transmission 24 and which is connected to the input shaft 22 via the forward/reverse switching device 26, an output shaft 30 serving as an output rotary member that is common to the continuously variable transmission 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, a differential gear device 38 connected to the gear 36 in a drive-force transmittable manner, and right and left axles 40 that are connected to the differential gear device 38. The engine 12, torque converter 20, input shaft 22, continuously variable transmission 24, forward/reverse switching device 26, gear mechanism 28, output shaft 30, counter shaft 32, reduction gear device 34, gear 36 and differential gear device 38 are disposed within the casing 18.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously variable transmission 24, reduction gear device 34, differential gear device 38, axles 40 and other elements. It is noted that the above-described drive force is synonymous with a drive torque or a drive power unless otherwise distinguished from them.

As described above, the drive-force transmitting apparatus 16 includes the gear mechanism 28 and the continuously variable transmission 24 that are provided in parallel with each other in respective drive-force transmitting paths PT between the engine 12 and the drive wheels 14. Specifically, the drive-force transmitting apparatus 16 includes the gear mechanism 28 and the continuously variable transmission 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously variable transmission 24. The first and second drive-force transmitting paths PT1, PT2 are defined in parallel with each other between the input shaft 22 and the output shaft 30. The first drive-force transmitting path PT1 is a drive-force transmitting path along which the drive force of the engine 12 is to be transmitted from the input shaft 22 toward the drive wheels 14 through the gear mechanism 28. The second drive-force transmitting path PT2 is a drive-force transmitting path along which the drive force of the engine 12 is to be transmitted from the input shaft 22 toward the drive wheels 14 through the continuously variable transmission 24. It is noted that the input shaft 22 is an input shaft that is common to the first and second transmitting paths PT1, PT2, and that the output shaft 30 is an output shaft that is common to the first and second transmitting paths PT1, PT2.

The first drive-force transmitting path PT1 is provided with: the forward/reverse switching device 26 including a first clutch C1 and a first brake B1; the gear mechanism 28; and a two-way clutch TWC serving as a third clutch, and is a drive-force transmitting path along which the drive force of the engine 12 is to be transmitted from the input shaft 22 to the drive wheels 14 through the gear mechanism 28. In the first drive-force transmitting path PT1, the forward/reverse switching device 26, gear mechanism 28 and two-way clutch TWC are arranged in this order of description in a direction away from the engine 12 toward the drive wheels 14, so that the first clutch C1 (that is included in the forward/reverse switching device 26) is located to be closer to the engine 12 than the two-way clutch TWC in the first drive-force transmitting path PT1. The second drive-force transmitting path PT2 is provided with the continuously variable transmission 24 and a second clutch C2, and is a drive-force transmitting path along which the drive force of the engine 12 is to be transmitted from the input shaft 22 to the drive wheels 14 through the continuously variable transmission 24. In the second drive-force transmitting path PT2, the continuously variable transmission 24 and second clutch C2 are arranged in this order of description in a direction away from the engine 12 toward the drive wheels 14.

The gear mechanism 28, which is provided in the first drive-force transmitting path PT1, provides a gear ratio EL (=input-shaft rotational speed Nin/output-shaft rotational speed Nout) that is higher than a highest gear ratio in the second drive-force transmitting path PT2 which corresponds to a highest gear ratio γmax of the continuously variable transmission 24. That is, the gear ratio EL of the gear mechanism 28, which may be interpreted also as a gear ratio in the first drive-force transmitting path PT1, is set to be a gear ratio that provides a lower speed than the highest gear ratio γmax, so that a gear ratio established in the second drive-force transmitting path PT2 provides a higher speed than the gear ratio EL established in the first drive-force transmitting path PT1. It is noted that the input-shaft rotational speed Nin is a rotational speed of the input shaft 22 and that the output-shaft rotational speed Nout is a rotational speed of the output shaft 30.

The continuously variable transmission 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously variable transmission 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The primary pulley 60 includes a primary hydraulic actuator 60a by which the effective diameter of the primary pulley 60 is variable. The secondary pulley 64 includes a secondary hydraulic actuator 64a by which the effective diameter of the secondary pulley 64 is variable.

In the drive-force transmitting apparatus 16, one of the first and second drive-force transmitting paths PT1, PT2, which is selected depending on a running state of the vehicle 10, is established, and the drive force of the engine 12 is transmitted to the drive wheels 14 along the established one of the first and second drive-force transmitting paths PT1, PT2. Therefore, the drive-force transmitting apparatus 16 includes a plurality of engagement devices for selectively establishing the first and second drive-force transmitting paths PT1, PT2. The plurality of engagement devices include the above-described first clutch C1, first brake B1, second clutch C2 and two-way clutch TWC.

The first clutch C1, which is provided in the first drive-force transmitting path PT1, is an engagement device which is configured to selectively connect and disconnect the first drive-force transmitting path PT1, and which is configured, when the vehicle 10 is to run in forward direction, to enable the drive force to be transmitted along the first drive-force transmitting path PT1, by being engaged. The first brake B1, which is also provided in the first drive-force transmitting path PT1, is an engagement device which is configured to selectively connect and disconnect the first drive-force transmitting path PT1, and which is configured, when the vehicle 10 is to run in reverse direction, to enable the drive force to be transmitted along the first drive-force transmitting path PT1 by being engaged. The first drive-force transmitting path PT1 is established by engagement of either the first clutch C1 or the first brake B1.

The two-way clutch TWC, which is also provided in the first drive-force transmitting path PT1, is to be placed in a selected one of an one-way mode and a lock mode, such that the two-way clutch TWC is configured to transmit the drive force during a driving state of the vehicle 10 in the forward running and to cut off transmission of the drive force during a driven state of the vehicle 10 in the forward running when the two-way clutch TWC is placed in the one-way mode, and such that the two-way clutch TWC is configured to transmit the drive force during the driving state of the vehicle 10 and during the driven state of the vehicle 10 when the two-way clutch TWC is placed in the lock mode. For example, with the first clutch C1 being placed in the engaged state and with the two-way clutch TWC being placed in the one-way mode, the drive force is transmittable along the first drive-force transmitting path PT1 during the driving state of the vehicle 10 during which the vehicle 10 runs in forward direction by the drive force of the engine 12. That is, during the forward running of the vehicle 10, the drive force of the engine 12 is transmitted to the drive wheels 14 along the first drive-force transmitting path PT1. On the other hand, during the driven state of the vehicle 10, for example, during an inertia running of the vehicle 10, rotation transmitted from the drive wheels 14 is blocked by the of the two-way clutch TWC even when the first clutch C1 is in the engaged state. It is noted that the driving state of the vehicle 10 is a state in which a torque applied to the input shaft 22 takes a positive value so as to act on the input shaft 22 in a direction corresponding to a direction of the running of the vehicle 10, namely, practically, a state in which the vehicle 10 is driven by the drive force of the engine 12. It is further noted that the driven state of the vehicle 10 is a state in which a torque applied to the input shaft 22 takes a negative value so as to act on the input shaft 22 in a direction opposite to a direction of the running of the vehicle 10, namely, practically, a state in which the vehicle 10 is caused to run by an inertia with the engine 12 being dragged by rotation transmitted from the drive wheels 14.

Further, in a state in which the two-way clutch TWC is in the lock mode with the first clutch C1 being in the engaged state, the drive force is enabled to be transmitted through the two-way clutch TWC during the driven state of the vehicle 10 as well as during the driving state of the vehicle 10. In this state, the drive force of the engine 12 is transmitted to the drive wheels 14 along the first drive-force transmitting path PT1, and, during the driven state of the vehicle 10 such as the inertia running, the rotation transmitted from the drive wheels 14 is transmitted to engine 12 along the first drive-force transmitting path PT1 whereby the engine 12 is dragged to generate an engine brake. Further, in a state in which the two-way clutch TWC is in the lock mode with the first brake B1 being in the engaged state, the drive force of the engine 12 is transmitted to the drive wheels 14 through the two-way clutch TWC along the first drive-force transmitting path PT1 and acts on the drive wheels 14 so as to force the drive wheels 14 to be rotated in a direction that causes the vehicle 10 to run in reverse direction. Thus, in this state, the vehicle 10 is enabled to run in the reverse direction with the drive force transmitted along the transmitting path PT1 to the drive wheels 14. The construction of the two-way clutch TWC will be described later.

The second clutch C2, which is provided in the second drive-force transmitting path PT2, is an engagement device which is configured to selectively connect and disconnect the second drive-force transmitting path PT2, and which is configured, when the vehicle 10 is to run in forward direction, to enable the drive force to be transmitted along the second drive-force transmitting path PT2, by being engaged. Each of the first clutch C1, first brake B1 and second clutch C2 is a known hydraulically-operated wet-type frictional engagement device that is to be frictionally engaged by operation of a hydraulic actuator. Each of the first clutch C1 and first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 100 (that corresponds to "control apparatus" recited in the appended claims), based on an operation amount θacc of an accelerator pedal 45 that corresponds to a required drive force of the vehicle 10 required by an operator of the vehicle 10, whereby an engine torque Te as an output of the engine 12 is controlled.

The torque converter 20 is provided between the engine 12 and each of the continuously variable transmission 24 and the forward/reverse switching device 26, and includes a pump impeller 20p and a turbine impeller 20t, such that the pump impeller 20p is connected to the engine 12 while the turbine impeller 20t is connected to the input shaft 22. The torque converter 20 is a fluid-operated type drive-force transmitting device configured to transmit the drive force of the engine 12 to the input shaft 22. The torque converter 20 is provided with a known lock-up clutch LU disposed between the pump impeller 20p and the turbine impeller 20t that serve as an input rotary member and an output rotary member of the torque converter 20, respectively, so that the pump impeller 20p and the turbine impeller 20t, namely, the engine 12 and the input shaft 22, can be directly connected to each other through the lock-up clutch LU, depending on the running state of the vehicle 10. The engine 12 and the input shaft 22 are directly connected to each other through the lock-up clutch LU, for example, when the vehicle 10 runs at a speed within a relatively high speed range.

The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 that is provided in the vehicle 10, for performing a shifting control operation in the continuously-variable transmission 24, generating a belt clamping force in the continuously-variable transmission 24, switching the operation state of the lock-up clutch LU and switching the operation state of each of the above-described engagement devices between its engaged state and released state, or between its one-way mode and lock mode.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is disposed radially outside the input shaft 22, and is connected to a small-diameter gear 48 that is rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is mounted on the counter shaft 50, rotatably relative to the counter shaft 50. The gear mechanism 28 further includes a counter gear 54 and an output gear 56. The counter gear 54 is mounted on the counter shaft 50, unrotatably relative to the counter shaft 50, and meshes with the output gear 56 that is mounted on the output shaft 30.

The two-way clutch TWC is provided between the large-diameter gear 52 and the counter gear 54 in an axial direction of the counter shaft 50, such that the two-way clutch TWC is located to be closer, than the first clutch C1 and the gear mechanism 28, to the drive wheels 14 in the first drive-force transmitting path PT1. The two-way clutch TWC is provided between the first clutch C1 and the drive wheels 14 in the first drive-force transmitting path PT1. The two-way clutch TWC is switchable between the one-way mode and the lock mode by operation of a hydraulic actuator 41 that is disposed to be adjacent to the two-way clutch TWC in the axial direction of the counter shaft 50, so as to be placed in a selected one of the one-way mode and the lock mode.

Figure 2:
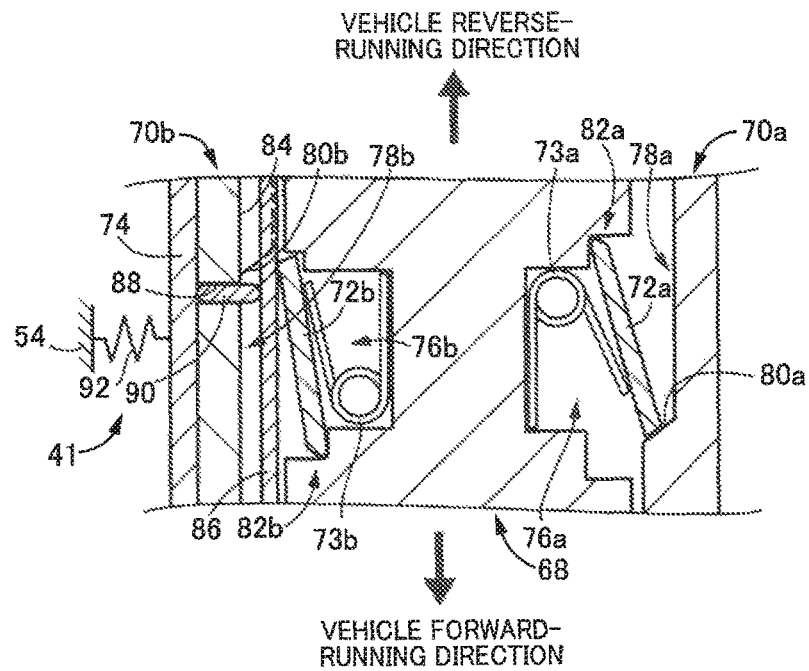
FIG. 2 is a view schematically showing a construction of a two-way clutch shown in FIG. 1, wherein the view is a cross sectional view of a circumferential portion of the two-way clutch, taken in a plane perpendicular to a radial direction of the two-way clutch, and shows the two-way clutch in its one-way mode.
Figure 3:
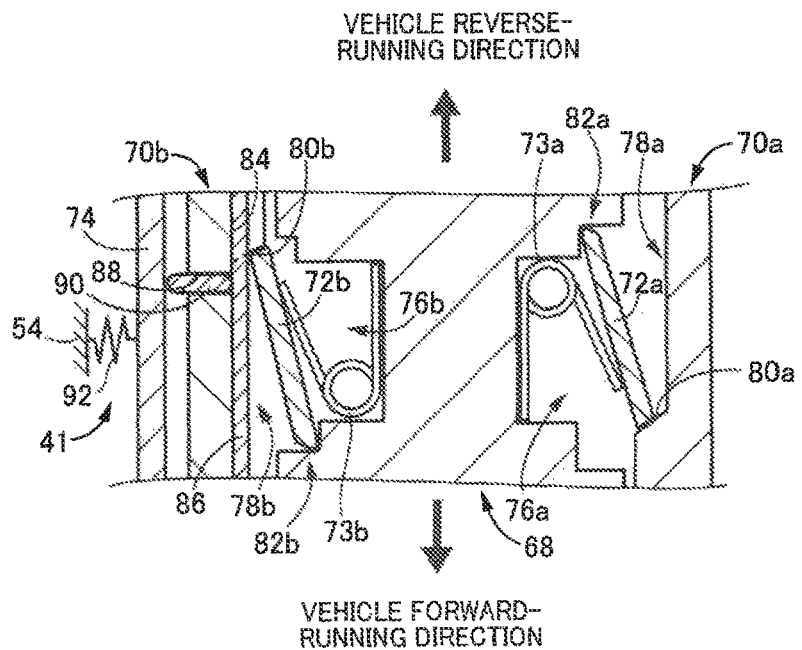
FIG. 3 is a view schematically showing the construction of the two-way clutch shown in FIG. 1, wherein the view is the cross sectional view of the circumferential portion, taken in the plane perpendicular to the radial direction of the two-way clutch, and shows the two-way clutch in its lock mode.

Each of FIGS. 2 and 3 is a view schematically showing a construction of the two-way clutch TWC, which enables switching between the one-way mode and the lock mode, wherein the view is a cross sectional view of a circumferential portion of the two-way clutch, taken in a plane perpendicular to a radial direction of the two-way clutch TWC. FIG. 2 shows a state in which the two-way clutch TWC is placed in the one-way mode. FIG. 3 shows a state in which the two-way clutch TWC is placed in the lock mode. In each of FIGS. 2 and 3, a vertical direction on the drawing sheet corresponds to a circumferential direction of the two-way clutch TWC, an upward direction on the drawing sheet corresponds to a vehicle reverse-running direction (i.e., direction of rotation for reverse running of the vehicle 10) and a downward direction on the drawing sheet corresponds to a vehicle forward-running direction (i.e., direction of rotation for forward running of the vehicle 10). Further, in each of FIGS. 2 and 3, a horizontal direction on the drawing sheet corresponds to the axial direction of the counter shaft 50 (hereinafter, the term "axial direction" means the axial direction of the counter shaft 50 unless otherwise specified), a rightward direction on the drawing sheet corresponds to a direction toward the large-diameter gear 52 shown in FIG. 1, and a leftward direction on the drawing sheet corresponds to a direction toward the counter gear 54 shown in FIG. 1.

The two-way clutch TWC has generally a disk shape, and is disposed radially outside the counter shaft 50. The two-way clutch TWC includes an input-side rotary member 68, first and second output-side rotary members 70a, 70b that are disposed to be adjacent to the input-side rotary member 68 so as to be located on respective opposite sides of the input-side rotary member 68 in the axial direction, a plurality of first struts 72a and a plurality of torsion coil springs 73a that are interposed between the input-side rotary member 68 and the first output-side rotary member 70a in the axial direction, and a plurality of second struts 72b and a plurality of torsion coil springs 73b that are interposed between the input-side rotary member 68 and the second output-side rotary member 70b in the axial direction. It is noted that the input-side rotary member 68 constitutes "input-side rotary portion (of the two-way clutch)" recited in the appended claims, and that the first and second output-side rotary members 70a, 70b cooperate with each other to constitute "output-side rotary portion (of the two-way clutch)" recited in the appended claims.

The input-side rotary member 68 has generally a disk shape, and is rotatable relative to the counter shaft 50 about an axis of the counter shaft 50. The input-side rotary member 68 is located between the first and second output-side rotary members 70a, 70b (hereinafter referred to as output-side rotary members 70 when they are not to be particularly distinguished from each other) in the axial direction. The input-side rotary member 68 is formed integrally with the large-diameter gear 52, such that teeth of the larger-diameter gear 52 are located radially outside the input-side rotary member 68. The input-side rotary member 68 is connected to the engine 12, in a drive-force transmittable manner, through the gear mechanism 28 and the forward/reverse switching device 26, for example.

The input-side rotary member 68 has, in its axial end surface that is opposed to the first output-side rotary member 70a in the axial direction, a plurality of first receiving portions 76a in which the first struts 72a and the torsion coil springs 73a are received. The first receiving portions 76a are equi-angularly spaced apart from each other in a circumferential direction of the input-side rotary member 68. Further, the input-side rotary member 68 has, in another axial end surface thereof that is opposed to the second output-side rotary member 70b in the axial direction, a plurality of second receiving portions 76b in which the second struts 72b and the torsion coil springs 73b are received. The second receiving portions 76b are equi-angularly spaced apart from each other in the circumferential direction of the input-side rotary member 68. The first and second receiving portions 76a are substantially aligned in a radial direction of the input-side rotary member 68.

The first output-side rotary member 70a has generally a disk-shaped, and is rotatable about the axis of the counter shaft 50. The first output-side rotary member 70a is unrotatable relative to the counter shaft 50, so as to be rotated integrally with the counter shaft 50. The first output-side rotary member 70a is connected to the drive wheels 14, in a drive-force transmittable manner, through the counter shaft 50, counter gear 54 output shaft 30 and differential gear device 38, for example.

The first output-side rotary member 70a has, in its surface that is opposed to the input-side rotary member 68 in the axial direction, a plurality of first recessed portions 78a each of which is recessed in a direction away from the input-side rotary member 68. The first recessed portions 78a, whose number is the same as the first receiving portions 76a, are equi-angularly spaced apart from each other in the circumferential direction. The first recessed portions 78a are substantially aligned with the first receiving portions 76a provided in the input-side rotary member 68, in a radial direction of the first output-side rotary member 70a. Therefore, when each of the first receiving portions 76a is aligned with one of the first recessed portions 78a in the circumferential direction, namely, when a rotational position of each of the first receiving portions 76a coincides with that of one of the first recessed portions 78a, the first receiving portion 76a and the first recessed portion 78a are opposed to and adjacent with each other in the axial direction. Each of the first recessed portions 78a has a shape by which a longitudinal end portion of any one of the first struts 72a can be received in the first recessed portion 78a. Further, each of the first recessed portions 78a has, in its circumferential end, a first wall surface 80a with which the longitudinal end portion of one of the first struts 72a is to be in contact, when the input-side rotary member 68 is rotated in the above-described vehicle forward-running direction (corresponding to the downward direction on the drawing sheet of each of FIGS. 2 and 3) relative to the output-side rotary members 70, by the drive force of the engine 12.

The second output-side rotary member 70b has generally a disk-shaped, and is rotatable about the axis of the counter shaft 50. The second output-side rotary member 70b is unrotatable relative to the counter shaft 50, so as to be rotated integrally with the counter shaft 50. The second output-side rotary member 70b is connected to the drive wheels 14, in a drive-force transmittable manner, through the counter shaft 50, counter gear 54, output shaft 30 and differential gear device 38, for example.

The second output-side rotary member 70b has, in its surface that is opposed to the input-side rotary member 68 in the axial direction, a plurality of second recessed portions 78b each of which is recessed in a direction away from the input-side rotary member 68. The second recessed portions 78b, whose number is the same as the second receiving portions 76b, are equi-angularly spaced apart from each other in the circumferential direction. The second recessed portions 78b are substantially aligned with the second receiving portions 76b provided in the input-side rotary member 68, in a radial direction of the second output-side rotary member 70b. Therefore, when each of the second receiving portions 76b is aligned with one of the second recessed portions 78b in the circumferential direction, namely, when a rotational position of each of the second receiving portions 76b coincides with that of one of the second recessed portions 78b, the second receiving portion 76b and the second recessed portion 78b are opposed to and adjacent with each other in the axial direction. Each of the second recessed portions 78b has a shape by which a longitudinal end portion of any one of the second struts 72b can be received in the second recessed portion 78b. Further, each of the second recessed portions 78b has, in its circumferential end, a second wall surface 80b with which the longitudinal end portion of one of the second struts 72b is to be in contact, when the input-side rotary member 68 is rotated in the above-described vehicle reverse-running direction (corresponding to the upward direction on the drawing sheet of each of FIGS. 2 and 3) relative to the output-side rotary members 70, by the drive force of the engine 12 with the two-way clutch TWC being placed in the lock mode, or when the vehicle 10 is in an inertia running state during the forward running with the two-way clutch TWC being placed in the lock mode.

Each of the first struts 72a is constituted by a plate-like member having a predetermined thickness, and is elongated in the circumferential direction (corresponding to the vertical direction on the drawing sheet), as shown in the cross sectional views of FIGS. 2 and 3. Further, each of the first struts 72a has a predetermined dimension as measured in a direction perpendicular to the drawing sheet of FIGS. 2 and 3.

The longitudinal end portion of each of the first struts 72a is constantly forced or biased, by a corresponding one of the torsion coil springs 73a, toward the first output-side rotary member 70a. Further, each of the first struts 72a is in contact at another longitudinal end portion thereof with a first stepped portion 82a provided in a corresponding one of the first receiving portions 76a, such that the first strut 72a is pivotable about the other longitudinal end portion thereof that is in contact with the first stepped portion 82a. Each of the torsion coil springs 73a is interposed between a corresponding one of the first struts 72a and the input-side rotary member 68, and constantly forces or biases the longitudinal end portion of the corresponding one of the first struts 72a toward the first output-side rotary member 70a.

Owing to the above-described construction, in a state in which the two-way clutch TWC is placed in either the one-way mode or the lock mode, when the input-side rotary member 68 receives the drive force which is transmitted from the engine 12 and which acts in the vehicle forward-running direction, each of the first struts 72a is in contact at the longitudinal end portion with the first wall surface 80a of the first output-side rotary member 70a and is in contact at the other longitudinal end portion with the first stepped portion 82a of the input-side rotary member 68, so that the input-side rotary member 68 and the first output-side rotary member 70a are inhibited from being rotated relative to each other whereby the drive force acting in the vehicle forward-running direction is transmitted to the drive wheels 14 through the two-way clutch TWC. The above-described first struts 72a, torsion coil springs 73a, first receiving portions 76a and first recessed portions 78a (each defining the first wall surface 80a) cooperate to constitute a one-way clutch that is configured to transmit the drive force acting in the vehicle forward-running direction, toward the drive wheels 14, and to cut off transmission of the drive force acting in the vehicle reverse-running direction, toward the drive wheels 14.

Each of the second struts 72b is constituted by a plate-like member having a predetermined thickness, and is elongated in the circumferential direction (corresponding to the vertical direction on the drawing sheet), as shown in the cross sectional views of FIGS. 2 and 3. Further, each of the second struts 72b has a predetermined dimension as measured in a direction perpendicular to the drawing sheet of FIGS. 2 and 3.

The longitudinal end portion of each of the second struts 72b is constantly forced or biased, by a corresponding one of the torsion coil springs 73b, toward the second output-side rotary member 70b. Further, each of the second struts 72b is in contact at another longitudinal end portion thereof with a second stepped portion 82b provided in one of the second receiving portions 76b, such that the second strut 72b is pivotable about the other longitudinal end portion thereof that is in contact with the second stepped portion 82b. Each of the torsion coil springs 73b is interposed between a corresponding one of the second struts 72b and the input-side rotary member 68, and constantly forces or biases the longitudinal end portion of the corresponding one of the second struts 72b toward the second output-side rotary member 70b.

Owing to the above-described construction, in a state in which the two-way clutch TWC is placed in the lock mode, when the input-side rotary member 68 receives the drive force which is transmitted from the engine 12 and which acts in the vehicle reverse-running direction, each of the second struts 72b is in contact at the longitudinal end portion with the second wall surface 80b of the second output-side rotary member 70b and is in contact at the other longitudinal end portion with the second stepped portion 82b of the input-side rotary member 68, so that the input-side rotary member 68 and the second output-side rotary member 70b are inhibited from being rotated relative to each other whereby the drive force acting in the vehicle reverse-running direction is transmitted to the drive wheels 14 through the two-way clutch TWC. Further, in the state in which the two-way clutch TWC is placed in the lock mode, when the inertia running is made during running of the vehicle 10 in the forward direction, too, each of the second struts 72b is in contact at the longitudinal end portion with the second wall surface 80b of the second output-side rotary member 70b and is in contact at the other longitudinal end portion with the second stepped portion 82b of the input-side rotary member 68, so that the input-side rotary member 68 and the second output-side rotary member 70b are inhibited from being rotated relative to each other whereby the rotation transmitted from the drive wheels 14 is transmitted toward the engine 12 through the two-way clutch TWC. The above-described second struts 72b, torsion coil springs 73b, second receiving portions 76b and second recessed portions 78b (each defining the second wall surface 80b) cooperate to constitute a one-way clutch that is configured to transmit the drive force acting in the vehicle reverse-running direction, toward the drive wheels 14, and to cut off transmission of the drive force acting in the vehicle forward-running direction, toward the drive wheels 14.

Further, the second output-side rotary member 70b has a plurality of through-holes 88 that pass through the second output-side rotary member 70b in the axial direction. Each of the through-holes 88 is located in a position that overlaps with a corresponding one of the second recessed portions 78b in the axial direction of the counter shaft 50, so that each of the through-holes 88 is in communication at its end with a corresponding one of the second recessed portions 78b. A cylindrical-shaped pin 90 is received in each of the through-holes 88, and is slidable in the through-hole 88. The pin 90 is in contact at one of its axially opposite ends with a pressing plate 74 that constitutes a part of the hydraulic actuator 41, and is in contact at the other of its axially opposite ends with an annular ring 86 that includes a plurality of portions that are located in the respective second recessed portions 78b in the circumferential direction.

The ring 86 is fitted in a plurality of arcuate-shaped grooves 84, each of which is provided in the second output-side rotary member 70b and interconnects between a corresponding adjacent pair of the second recessed portions 78b that are adjacent to each other in the circumferential direction. The ring 86 is movable relative to the second output-side rotary member 70b in the axial direction.

Like the two-way clutch TWC, the hydraulic actuator 41 is disposed on the counter shaft 50, and is located in a position adjacent to the second output-side rotary member 70b in the axial direction of the counter shaft 50. The hydraulic actuator 41 includes, in addition to the pressing plate 74, a plurality of coil springs 92 that are interposed between the counter gear 54 and the pressing plate 74 in the axial direction, and a hydraulic chamber (not shown) to which a working fluid is to be supplied whereby a thrust is generated to move the pressing plate 74 toward the counter gear 54 in the axial direction.

The pressing plate 74 has generally a disk shape, and is disposed to be movable relative to the counter shaft 50 in the axial direction. The pressing plate 74 is constantly forced or biased by the spring 92 toward the second output-side rotary member 70*b* in the axial direction. Therefore, in a state in which the working fluid is not supplied to the above-described hydraulic chamber of the hydraulic actuator 41, the pressing plate 74 is moved, by biasing force of the spring 92, toward the second output-side rotary member 70*b* in the axial direction, whereby the pressing plate 74 is in contact with the second output-side rotary member 70*b*, as shown in FIG. 2. In this state, the pins 90, the ring 86 and the longitudinal end portion of each of the second struts 72*b* are moved toward the input-side rotary member 68 in the axial direction, as shown in FIG. 2, whereby the two-way clutch TWC is placed in the one-way mode.

In a state in which the working fluid is supplied to the above-described hydraulic chamber of the hydraulic actuator 41, the pressing member 74 is moved, against the biasing force of the spring 90, toward the counter gear 54 in the axial direction, so as to be separated from the second output-side rotary member 70*b*. In this state, the pins 90, the ring 86 and the longitudinal end portion of each of the second struts 72*b* are moved, by the biasing force of the torsion coil springs 73*b*, toward the counter gear 54 in the axial direction, as shown in FIG. 3, whereby the two-way clutch TWC is placed in the lock mode.

In the state in which the two-way clutch TWC is placed in the one-way mode, as shown in FIG. 2, the pressing plate 74 is in contact with the second output-side rotary member 70*b* by the biasing force of the spring 92. In this state, the pins 90 are forced, by the pressing plate 74, to be moved toward the input-side rotary member 68 in the axial direction, and the ring 86 is forced, by the pins 90, to be moved toward the input-side rotary member 68 in the axial direction. Consequently, the longitudinal end portion of each of the second struts 72*b* is forced, by the ring 86, to be moved toward the input-side rotary member 68, so as to be blocked from being in contact with the second wall surface 80*b*, whereby the input-side rotary member 68 and the second output-side rotary member 70*b* are allowed to be rotated relative to each other so that the second struts 72*b* do not serve as a one-way clutch. Meanwhile, the longitudinal end portion of each of the first struts 72*a* is biased, by the corresponding coil spring 73*a*, toward the first output-side rotary member 70*a*, whereby the longitudinal end portion of each of the first struts 72*a* can be bought into contact with the first wall surface 80*a* of any one of the first recessed portions 78*a* so that the first struts 72*a* serve as a one-way clutch configured to transmit the drive force acting in the vehicle forward-running direction.

In the state in which the two-way clutch TWC is placed in the one-way mode, as shown in FIG. 2, the longitudinal end portion of each of the first struts 72*a* can be brought into contact with the first wall surface 80*a* of the first output-side rotary member 70*a*. Therefore, in the state of the one-way mode of the two-way clutch TWC, when the vehicle 10 is placed in the driving state in which the drive force acting in the vehicle forward-running direction is transmitted from the engine 12 to the two-way clutch TWC, the longitudinal end portion of each of the first struts 72*a* is in contact with the first wall surface 80*a* and the other longitudinal end portion of each of the first struts 72*a* is in contact with the first stepped portion 82*a*, so that the input-side rotary member 68 is inhibited from being rotated relative to the first output-side rotary member 70*a* in the vehicle forward-running direction whereby the drive force of the engine 12 is transmitted to the drive wheels 14 through the two-way clutch TWC. On the other hand, in the state of the one-way mode of the two-way clutch TWC, when the vehicle 10 is placed in the driven state by inertia running during the forward running, the input-side rotary member 68 is allowed to be rotated relative to the first output-side rotary member 70*a* in the vehicle reverse-running direction, without the longitudinal end portion of each of the first struts 72*a* being in contact with the first wall surface 80*a*, whereby the transmission of the drive force through the two-way clutch TWC is blocked. Thus, in the state in which the two-way clutch TWC is placed in the one-way mode, the first struts 72*a* serve as a one-way clutch which is configured to transmit the drive force in the driving state of the vehicle 10 in which the drive force acting in the vehicle forward-running direction is transmitted from the engine 12, and which is configured to block transmission of the drive force in the driven state of the vehicle 10 which is placed by inertia running during the forward running. In other words, the input-side rotary member 68 as the input-side rotary portion is inhibited from being rotated in the vehicle forward-running direction (as a predetermined one of opposite directions) relative to the output-side rotary members 70 as the output-side rotary portion, and is allowed to be rotated in the vehicle reverse-running direction (as the other of the opposite directions) relative to the output-side rotary members 70 as the output-side rotary portion, when the two-way clutch TWC is placed in the one-way mode.

In the state in which the two-way clutch TWC is placed in the lock mode, as shown in FIG. 3, the working fluid is supplied to the hydraulic chamber of the hydraulic actuator 41 whereby the pressing plate 74 is moved, against the spring 92, in a direction away from the second output-side rotary member 70*b*, and the longitudinal end portion of each second strut 72*b* is moved, by biasing force of the corresponding torsion coil spring 73*b*, toward the corresponding second recessed portion 78*b* of the second output-side rotary member 70*b*, whereby the longitudinal end portion of each second strut 72*b* can be brought into contact with the second wall surface 80*b* of the second output-side rotary member 70*b*. Meanwhile, each first strut 72*a* can be brought into contact at the longitudinal end portion with the first wall surface 80*a* of the first output-side rotary member 70*a*, as in the state of the one-way mode shown in FIG. 2.

In the state in which the two-way clutch TWC is placed in the lock mode, as shown in FIG. 3, when the drive force acting in the vehicle forward-running direction is transmitted to the input-side rotary member 68, the longitudinal end portion of each first strut 72*a* is brought into contact with the first wall surface 80*a* of the first output-side rotary member 70*a*, and the other longitudinal end portion of each first strut 72*a* is brought into contact with the first stepped portion 82*a* of the input-side rotary member 68, whereby the input-side rotary member 68 is inhibited from being rotated relative to the first output-side rotary member 70*a* in the vehicle forward-running direction. In the state of the lock mode of the two-way clutch TWC, when the drive force acting in the vehicle reverse-running direction is transmitted to the input-side rotary member 68, the longitudinal end portion of each second strut 72*b* is brought into contact with the second wall surface 80*b* of the second output-side rotary member 70*b*, and the other longitudinal end portion of each second strut 72b is brought into contact with the second stepped portion 82b of the input-side rotary member 68, whereby the input-side rotary member 68 is inhibited from being rotated relative to the second output-side rotary member 70b in the vehicle reverse-running direction. Thus, in the state of the lock mode of the two-way clutch TWC, the first struts 72a serve as a one-way clutch and the second struts 72b serve as a one-way clutch, so that the two-way clutch TWC is configured to transmit the drive force acting in the vehicle forward-running direction and the drive force acting in the vehicle reverse-running direction. In other words, the input-side rotary member 68 as the input-side rotary portion is inhibited from being rotated in both of the opposite directions relative to the output-side rotary members 70 as the output-side rotary portion, when the two-way clutch TWC is placed in the lock mode. When the vehicle 10 is to run in reverse direction, the vehicle 10 is enabled to run in reverse direction with the two-way clutch TWC being placed in the lock mode. Further, when the vehicle 10 is placed in the driven state by inertia running during the forward running, an engine brake can be generated with the two-way clutch TWC being placed in the lock mode by which the engine 12 is dragged by rotation transmitted from the drive wheels 14 to the engine 12 through the two-way clutch TWC. Thus, in the state of the lock mode of the two-way clutch TWC, the first struts 72a serve as a one-way clutch and the second struts 72b serve as a one-way clutch, so that the two-way clutch TWC is configured to transmit the drive force during the driving state and the driven state of the vehicle 10.

FIG. 4 is a table indicating an operation state of each of the engagement devices for each of a plurality of operation positions POSsh which is selected by operation of a manually-operated shifting device in the form of a shift lever 98 that is provided in the vehicle 10. In FIG. 4, "C1" represents the first clutch C1, "C2" represents the second clutch C2, "B1" represents the first brake B1, and "TWC" represents the two-way clutch TWC. Further, "P", "R", "N", "D" and "M" represent a a parking position P, a reverse position R, a neutral position N, a drive position D and a manual position M, respectively, as the plurality of operation positions POSsh, each of which is to be selected by operation of the shift lever 98. In the table of FIG. 4, "0" in the first clutch C1, second clutch C2 or first brake B1 indicates its engaged state, and blank in the first clutch C1, second clutch C2 or first brake B1 indicates its released state. Further, in the table of FIG. 4, "0" in the two-way clutch TWC indicates its lock mode, and blank in the two-way clutch TWC indicates its one-way mode.

For example, when the shift lever 98 is placed in the parking position P as one of the operating positions POSsh that is a vehicle stop position or in the neutral position N as one of the operating positions POSsh that is a drive-force transmission block position, the first clutch C1, second clutch C2 and first brake B1 are placed in the released positions, as indicated in FIG. 4, so that the drive-force transmitting apparatus 16 is placed in its neutral state in which the drive force is not transmitted along either the first drive-force transmitting path PT1 or the second drive-force transmitting path PT2.

When the shift lever 98 is placed in the reverse position R as one of the operating positions POSsh that is a reverse running position, the first brake B1 is placed in the engaged state and the two-way clutch TWC is placed in the lock mode, as indicated in FIG. 4. With the first brake B1 being placed in the engaged state, the drive force acting in the vehicle reverse-running direction is transmitted from the engine 12 to the gear mechanism 28. In this instance, if the two-way clutch TWC is in the one-way mode, the drive force is blocked by the two-way clutch TWC so that reverse running cannot be made. Thus, with the two-way clutch TWC being placed in the lock mode, the drive force acting in the vehicle reverse-running direction is transmitted to the output shaft 30 through the two-way clutch TWC so that reverse running can be made. When the shift lever 98 is placed in the reverse position R, the first brake B1 is placed in the engaged state and the two-way clutch TWC is placed in the lock mode, whereby a reverse gear position is established to transmit the drive force acting in the vehicle reverse-running direction, through the gear mechanism 28 along the first drive-force transmitting path PT1, to the drive wheels 14.

When the shift lever 98 is placed in the drive position D as one of the operating positions POSsh that is a forward running position, the first clutch C1 is placed in the engaged state or the second clutch C2 is placed in the engaged state, as indicated in FIG. 4. In FIG. 4, "D1" and "D2" represent a drive position D1 and a drive position D2, respectively, which are operating positions virtually set in control. When the shift lever 98 is placed in the drive position D, one of the drive position D1 and the drive position D2 is selected depending a running state of the vehicle 10, and the selected one is automatically established. The drive position D1 is established when the vehicle running speed is within a relatively low speed range including zero speed (vehicle stop). The drive position D2 is established when the vehicle running speed is within a relatively high speed range including a middle speed range. For example, during running of the vehicle 10 with the shift lever 98 being placed in the drive position D, when the running state of the vehicle 10 is changed from the low speed range to the high speed range, the drive position D1 is automatically switched to the drive position D2.

For example, when the running state of the vehicle 10 is in a speed range corresponding to the drive position D1 upon placement of the shift lever 98 into the drive position D, the first clutch C1 is engaged and the second clutch C2 is released. In this case, a gear running mode is established whereby the drive force acting in the vehicle forward-running direction is transmitted from the engine 12 to the drive wheels 14 along the first drive-force transmitting path PT1 through the gear mechanism 28. The two-way clutch TWC, which is placed in the one-way mode, transmits the drive force acting in the vehicle forward-running direction.

Further, when the running state of the vehicle 10 is in a speed range corresponding to the drive position D2 upon placement of the shift lever 98 into the drive position D, the first clutch C1 is released and the second clutch C2 is engaged. In this case, a belt running mode is established whereby the drive force acting in the vehicle forward-running direction is transmitted from the engine 12 to the drive wheels 14 along the second drive-force transmitting path PT2 through the continuously variable transmission 24. Thus, when the shift lever 98 is placed into the drive position D as one of the operating positions POSsh, the drive force of the engine 12 is transmitted to the drive wheels 14 along a selected one of the first and second drive-force transmitting paths PT1, PT2, which is selected depending on the running state of the vehicle 10.

When the shift lever 98 is placed in the manual position M as one of the operating positions POSsh, a shift-up operation or a shift-down operation can be executed by a manual operation made by an operator of the vehicle 10. That is, the manual position M is a manual shift position in which a shifting operation can be made by the manual operation made by the operator. For example, when a shift-down operation is manually made by the operator with the shift lever 98 being placed in the manual position M, the first clutch C1 is placed into the engaged state and the two-way clutch TWC is placed into the lock mode whereby a forward-running gear position is established. With the two-way clutch TWC being placed in the lock mode, the drive force can be transmitted through the two-way clutch TWC during the driven state of the vehicle 10 as well as during the driving state of the vehicle 10. During the inertia running, for example, the vehicle 10 is placed in the driven state in which the rotation is transmitted from the drive wheels 14 toward the engine 12. In the driven state, when the shift-down operation is manually executed with the shift lever 98 being placed in the manual position M, the rotation transmitted from the drive wheels 14 is transmitted toward the engine 12 through the two-way clutch TWC that is placed in the lock mode, whereby the engine 12 is dragged to generate an engine brake. Thus, when the shift-down operation is executed with the shift lever 98 being placed in the manual position M, the forward-running gear position is established so that the drive force is transmitted to the drive wheels 14 along the first drive-force transmitting path PT1 through the gear mechanism 28, and so that the rotation transmitted from the drive wheels 14 is transmitted toward the engine 12 along the first drive-force transmitting path PT1 so as to generate the engine brake during the inertia running.

When a shift-up operation is manually made by the operator with the shift lever 98 being placed in the manual position M, the second clutch C2 is placed into the engaged state whereby a forward-running continuously-variable shifting position is established so that the drive force is transmitted to the drive wheels 14 along the second drive-force transmitting path PT2 through the continuously variable transmission 24. Thus, with the shift lever 98 being placed in the manual position M, a manual shifting can be executed by manual operation made by the operator, to select one of the forward-running gear position and the forward-running continuously-variable shifting position. When the forward-running gear position, i.e., the gear running mode, is selected, the drive force can be transmitted along the first drive-force transmitting path PT1. When the forward-running continuously-variable shifting position, i.e., the belt running mode, is selected, the drive force can be transmitted along the second drive-force transmitting path PT2. The case in which the shift-down operation has been made with the shift lever 98 being placed in the manual position M, corresponds to "M1" (position M1) that is shown in FIG. 4. The case in which the shift-up operation has been made with the shift lever 98 being placed in the manual position M, corresponds to "M2" (position M2) that is shown in FIG. 4. Although the positions M1, M2 do not exist in appearance, for the purpose of convenience in the following description, it will be described that "the position M1 is established" or "the operating position POSsh is switched to the position M1" when the shift-down operation has been manually made with the shift lever 98 being placed in the manual position M, and it will be described that "the position M2 is established" or "the operating position POSsh is switched to the position M2" when the shift-up operation has been manually made with the shift lever 98 being placed in the manual position M.

Referring back to FIG. 1, the vehicle 10 is provided with the electronic control apparatus 100 as a controller including the control apparatus constructed according to present invention. For example, the electronic control apparatus 100 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 100 is configured to perform, for example, an engine control operation for controlling an output of the engine 12, a shifting control operation and a belt-clamping-force control operation for the continuously-variable transmission 24, and a hydraulic-pressure control operation for switching the operation state of each of the plurality of engagement devices (C1, B1, C2, TWC). The electronic control apparatus 100 may be constituted by two or more control units exclusively assigned to perform different control operations such as the engine control operation and the hydraulic-pressure control operation.

The electronic control apparatus 100 receives various input signals based on values detected by respective sensors provided in the vehicle 10. Specifically, the electronic control apparatus 100 receives: an output signal of an engine speed sensor 102 indicative of an engine rotational speed Ne which is a rotational speed of the engine 12; an output signal of a primary speed sensor 104 indicative of a primary rotational speed Npri which is a rotational speed of the primary shaft 58 which is equivalent to an input-shaft rotational speed Nin; an output signal of a secondary speed sensor 106 indicative of a secondary rotational speed Nsec which is a rotational speed of the secondary shaft 62; an output signal of an output speed sensor 108 indicative of an output-shaft rotational speed Nout which is a rotational speed of the output shaft 30 and which corresponds to the running speed V of the vehicle 10; an output signal of an input speed sensor 109 indicative of an input rotational speed Ntwcin which is a rotational speed of the input-side rotary member 68 of the two-way clutch TWC; an output signal of an accelerator-operation amount sensor 110 indicative of the above-described operation amount θacc of the accelerator pedal 45 which represents an amount of accelerating operation made by the vehicle operator; an output signal of a throttle-opening degree sensor 112 indicative of the throttle opening degree tap; an output signal of a shift position sensor 114 indicative of an operation position POSsh of a manually-operated shifting device in the form of the shift lever 98 provided in the vehicle 10; and an output signal of a temperature sensor 116 indicative of a working fluid temperature THoil that is a temperature of a working fluid in the hydraulic control unit 46. It is noted that the input-shaft rotational speed Nin (=primary rotational speed Npri) is equivalent to a rotational speed NT of the turbine impeller 20t of the of the torque converter 20. Further, the electronic control apparatus 100 calculates an actual gear ratio γcvt (=Npri/Nsec) that is an actual value of the gear ratio γcvt of the continuously-variable transmission 24, based on the primary rotational speed Npri and the secondary rotational speed Nsec. Moreover, the electronic control apparatus 100 calculates an output rotational speed Ntwcout of the first and second output-side rotary members 70a, 70b of the two-way clutch TWC, based on the output-shaft rotational speed Nout.

Further, the electronic control apparatus 100 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission 24, a hydraulic-control command signal Scbd for performing hydraulic controls of operation states of the plurality of engagement devices, and a hydraulic-control command signal Slu for performing hydraulic controls of an operation state of the lock-up clutch LU.

The hydraulic control unit 46, which receives the above-described hydraulic control command signals, outputs a SL1 pressure Psl1 that is applied to a hydraulic actuator of the first clutch C1, a B1 control pressure Pb1 that is applied to a hydraulic actuator of the first brake B1, a SL2 pressure Psl2 that is applied to a hydraulic actuator of the second clutch C2, a TWC pressure Ptwc that is applied to the hydraulic actuator 41 configured to switch the two-way clutch TWC between the one-way mode and the lock mode, a primary pressure Ppri that is applied to the hydraulic actuator 60a of the primary pulley 60, a secondary pressure Psec that is applied to the hydraulic actuator 64a of the secondary pulley 64, and a LU pressure Plu that is applied for controlling the lock-up clutch LU. It is noted that each of the SL1 pressure Psl1, SL2 pressure Psl2, B1 control pressure Pb1, TWC pressure Ptwc, primary pressure Ppri, secondary pressure Psec and LU pressure Plu is regulated directly or indirectly by an electromagnetic valve (not shown) that is provided in the hydraulic control unit 46.

For performing various control operations in the vehicle 10, the electronic control apparatus 100 includes an engine control means or portion in the form of an engine control portion 120 and a transmission shifting control means or portion in the form of a transmission-shifting control portion 122.

The engine control portion 120 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 120 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

When the shift lever 98 is switched from the parking position P or the neutral position N to the drive position D during stop of the vehicle 10, for example, the transmission-shifting control portion 122 supplies, to the hydraulic control unit 46, the hydraulic-control command signal Scbd requesting engagement of the first clutch C1, whereby the forward gear running mode is established to enable forward running of the vehicle 10 by the drive force transmitted along the first drive-force transmitting path PT1. When the shift lever 98 is switched from the parking position P or the neutral position N to the reverse position R during stop of the vehicle 10, the transmission-shifting control portion 122 supplies, to the hydraulic control unit 46, the hydraulic-control command signal Scbd requesting engagement of the first brake B1 and switching of the two-way clutch TWC to the lock mode, whereby the reverse gear running mode is established to enable reverse running of the vehicle 10 by the drive force transmitted along the first drive-force transmitting path PT1.

During running of the vehicle 10 in the belt running mode by the drive force with the drive force transmitted along the second drive-force transmitting path PT2, for example, the transmission-shifting control portion 122 outputs the hydraulic control command signal Scvt by which the gear ratio γ of the continuously variable transmission 24 is controlled to a target gear ratio γtgt that is calculated based on, for example, the accelerator operation amount θacc and the vehicle running speed V. Specifically, the transmission-shifting control portion 122 stores therein a predetermined relationship (e.g., shifting map) which assures an appropriately adjusted belt clamping force in the continuously variable transmission 24 and which establishes the target gear ratio γtgt of the continuously variable transmission 24 that enables the engine 12 to be operated at an operating point lying on an optimum line (e.g., engine optimum-fuel-efficiency line). The transmission-shifting control portion 122 determines a target primary pressure Ppritgt as a command value of the primary pressure Ppri that is to be applied to the hydraulic actuator 60a of the primary pulley 60 and a target secondary pressure Psectgt as a command value of the secondary pressure Psec that is to be applied to the hydraulic actuator 64a of the secondary pulley 64, in accordance with the above-described stored relationship, based on the accelerator operation amount θacc and the vehicle running speed V. Thus, the transmission-shifting control portion 122 executes a shifting control of the continuously variable transmission 24, by supplying, to the hydraulic control unit 46, the hydraulic control command signal Scvt by which the primary pressure Ppri and the secondary pressure Psec are to be controlled to the target primary pressure Ppritgt and the target secondary pressure Psectgt, respectively. It is noted that the shifting control of the continuously variable transmission 24, which is a known technique, will not be described in detail.

Further, when the shift lever 98 is placed in the drive position D, the transmission-shifting control portion 122 executes a switching control operation for switching the running mode between the gear running mode and the belt running mode. Specifically, the transmission-shifting control portion 122 stores therein a predetermined relationship in the form of a shifting map for shifting from one of first and second speed positions to the other, wherein the first speed position corresponds the gear ratio EL of the gear mechanism 28 in the gear running mode, and the second speed position corresponds to the highest gear ratio γmax of the continuously variable transmission 24 in the belt running mode. In the shifting map, which is constituted by, for example, the running speed V and the accelerator operation amount θacc, a shift-up line is provided for determining whether a shift-up action to the second speed position, namely, switching to the belt running mode is to be executed or not, and a shift-down line is provided for determining whether a shift-down action to the first speed position, namely, switching to the gear running mode is to be executed or not. The transmission-shifting control portion 122 determines whether the shift-up action or shift-down action is to be executed or not, by applying actual values of the running speed V and the accelerator operation amount θacc to the shifting map, and executes the shift-up action or shift-down action (namely, switches the running mode), depending on result of the determination. For example, when a running state point, which is defined by a combination of the actual values of the running speed V and the accelerator operation amount θacc, is moved across the shift-down line in the shifting map during the running in the belt running mode, for example, it is determined that there is a request (i.e., shift-down request) requesting the shift-down action to the first speed position, namely, there is a request for the switching to the gear running mode. When the running state point is moved across the shift-up line in the shifting map during the running in the gear running mode, for example, it is determined that there is a request (i.e., shift-up request) requesting the shift-up action to the second speed position, namely, there is a request for the switching to the belt running mode. It is noted that the gear running mode corresponds to "D1" (drive position D1) shown in FIG. 4 and that the belt running mode corresponds to "D2" (drive position D2) shown in FIG. 4.

For example, during the running in the gear running mode (corresponding to the drive position D1) with the shift lever 98 being placed in the drive position D, when it is determined that the request for the shift-up action to the second speed position, i.e., the switching of the operating position POSsh to the belt running mode, is issued or made, the transmission-shifting control portion 122 outputs, to the hydraulic control unit 46, a command requesting release of the first clutch C1 and engagement of the second clutch C2, whereby the second drive-force transmitting path PT2 is established in place of the first drive-force transmitting path PT1 so that the drive force can be transmitted along the second drive-force transmitting path PT2 in the drive-force transmitting apparatus 16. Thus, the transmission-shifting control portion 122 switches from the gear running mode (in which the drive force is to be transmitted along the first drive-force transmitting path PT1) to the belt running mode (in which the drive force is to be transmitted along the second drive-force transmitting path PT2), by a stepped shifting control (shift-up control) by which the first clutch C1 is released and the second clutch C2 is engaged.

With the running mode of the vehicle 10 being switched to the belt running mode, the drive force is transmitted along the second drive-force transmitting path PT2 through the continuously variable transmission 24 in the drive-force transmitting apparatus 16. In this instance, the rotation of the drive wheels 14 is transmitted to the counter gear 54 through the differential gear device 38, reduction gear device 34 and output gear 56, for example, but the rotation of the counter gear 54 is blocked by the two-way clutch TWC that is placed in the one-way mode and is not transmitted to the gear mechanism 28. Therefore, even if the running speed V becomes high, it is possible to prevent restrain the gear mechanism 28 and the first clutch C1 from being rotated at a high speed, because the rotation of the drive wheels 14 is not transmitted to the gear mechanism 28 and the first clutch C1.

By the way, for example, during the running with the operating position POSsh is switched to the position M1, the two-way clutch TWC is placed in the lock mode. In this instance, if the vehicle 10 is placed in an inertia running state, the vehicle 10 is placed in the driven state to be caused to run by an inertia. During the driven state of the vehicle 10, when the operating position POSsh is switched from the position M1 to the position M2, for example, control operations are executed to establish the second drive-force transmitting path PT2 (belt running mode) in place of the first drive-force transmitting path PT1 (gear running mode) and to switch the two-way clutch TWC from the lock mode to the one-way mode. Specifically, a TWC pressure Ptwc, which is applied to the hydraulic actuator 41 configured to control the operation of the two-way clutch TWC, is controlled to zero. In this instance, during the driven state of the vehicle 10, the longitudinal end portion of each of the second struts 72b and the second wall surface 80b of the second output-side rotary member 70b apply forces onto each other, and their mutual contact is not easily released, so that the two-way clutch TWC could fail to be switched from the lock mode to the one-way mode. Further, if the vehicle running is continued with the two-way clutch TWC being held in the lock mode, namely, without the switching of the two-way clutch TWC to the one-way mode, the rotation of the drive wheels 14 is transmitted to the first clutch C1 through the two-way clutch TWC, so that there is a risk that the first clutch C1 (precisely, a drum or other components of the first clutch C1 that are connected to the two-way clutch TWC) could be rotated at a high speed when the running speed V becomes a high speed.

To solve the above-described issue, in the present embodiment, the electronic control apparatus 100 is provided with a function of executing a dither control (dither processing) for fluctuating a hydraulic pressure applied to the hydraulic actuator 41 (by which the switching of the two-way clutch TWC is controlled), when a request for establishing the second drive-force transmitting path PT2 in place of the first drive-force transmitting path PT1 is made during forward running of the vehicle 10 with the vehicle 10 being placed in the driven state and with the two-way clutch TWC being placed in the lock mode. Hereinafter, there will be described control operations that are to be executed when the request for establishing the second drive-force transmitting path PT2 in place of the first drive-force transmitting path PT1 is made during the running with the two-way clutch TWC being placed in the lock mode.

For executing the above-described control operations, the transmission-shifting control portion 122 includes a shift-up-request determining means or portion in the form of a shift-up-request determining portion 126, a running running-state determining means or portion in the form of a running-state determining portion 128, an unlock-request determining means or portion in the form of an unlock-request determining portion 130, an unlock-failure determining means or portion in the form of an unlock-failure determining portion 132 and a dither control means or portion in the form of a dither control portion 134.

The shift-up-request determining portion 126 determines whether the shift-up request for establishing the second drive-force transmitting path PT2 in place of the first drive-force transmitting path PT1, namely, switching from the gear running mode to the belt running mode, is made during the forward running. The shift-up-request determining portion 126 determines that the shift-up request is made when the operating position POSsh has been switched from the position M1 to the position M2 or the drive position D (position D2).

At a point of time at which the shift-up request is made, the running-state determining portion 128 determines whether the two-way clutch TWC is placed in the lock mode and the vehicle 10 is placed in the driven state (in which the vehicle 10 is caused to run by an inertia). The running-state determining portion 128 determines that the two-way clutch TWC is placed in the lock mode, for example, when the operating positions POSsh is the position M1. Alternatively, the running-state determining portion 128 may determine that the two-way clutch TWC is placed in the lock mode when a rotational speed difference ΔNtwc (|Ntwcin−Ntwcout|) between the input rotational speed Ntwcin (that is the rotational speed of the input-side rotary member 68 of the two-way clutch TWC) and the output rotational speed Ntwcout (that is the rotational speed of the output-side rotary members 70) is smaller than a determination threshold value α. The determination threshold value α is a predetermined threshold value which is obtained by experimentation or determined by an appropriate design theory and based on which it can be determined whether the two-way clutch TWC is placed in the lock mode or not. In other words, it can be determined that the two-way clutch TWC is placed in the one-way mode when the rotational speed difference ΔNtwc is not smaller than the determination threshold value α.

Further, the running-state determining portion 128 determines that the vehicle 10 is placed in the driven state when the running speed V is not lower than a predetermined speed value V1 and the accelerator operation amount θacc of the accelerator pedal 45 is not larger than a predetermined amount value θ1. The predetermined speed value V1 and the predetermined amount value θ1 are predetermined threshold values which are obtained by experimentation or determined by an appropriate design theory and based on which it can be determined whether the vehicle 10 is placed in the driven state.

When it is determined by the running-state determining portion 128 that the two-way clutch TWC is placed in the lock mode and the vehicle 10 is placed in the driven state, the unlock-request determining portion 130 determines whether an unlock request for switching the two-way clutch TWC from the lock mode to the one-way mode is outputted or not. That is, the unlock-request determining portion 130 determines whether a control for switching the two-way clutch TWC to the one-way mode has been started to be executed or not.

The unlock-failure determining portion 132 determines whether an unlock failure occurs or not, namely, whether the two-way clutch TWC fails to be switched to the one-way mode or not in spite of execution of the control for switching the two-way clutch TWC to the one-way mode. For this determination, the unlock-failure determining portion 132 calculates the rotational speed difference ΔNtwc between the input rotational speed Ntwcin of the input-side rotary member 68 and the output rotational speed Ntwcout of the output-side rotary members 70 when a given length tα of time has elapsed from a point of time at which the execution of the control for switching the two-way clutch TWC to the one-way mode was started, and then determines whether the calculated rotational speed difference ΔNtwc is smaller than the determination threshold value α (|Ntwcin−Ntwcout|<α) or not. The unlock-failure determining portion 132 determines that the unlock failure of the two-way clutch TWC occurs when the calculated rotational speed difference ΔNtwc is smaller than the determination threshold value α. The given length tα of time is a predetermined length value which is obtained by experimentation or determined by an appropriate design theory and within which the two-way clutch TWC is to be switched to the one-way mode in case of a normal state.

When it is determined that the unlock failure of the two-way clutch TWC occurs, the dither control portion 134 outputs, to the hydraulic control unit 46, a command requesting execution of the dither control for vibrating or fluctuating the TWC pressure Ptwc applied to the hydraulic actuator 41 (that is configured to control switching of the two-way clutch TWC), such that the TWC pressure Ptwc is fluctuated with a period of (T+β), wherein "T" represents a time constant of the TWC pressure Ptwc and a given value β. The time constant T is a value that is obtained by experimentation or determined by an appropriate design theory. The given value β is a predetermined value that is set by taking account of, for example, variations of components, such that an actual pressure value (hereinafter referred to as a TWC pressure Ptwcr) of the TWC pressure Ptwc follows a command value (hereinafter referred to as a TWC pressure Ptwci) of the TWC pressure Ptwc when the TWC pressure Ptwci is vibrated or fluctuated at the period of (T+0). With execution of the dither control, a periodical force is applied to the second struts 72b of the two-way clutch TWC shown in FIG. 3, so that the longitudinal end portion of each of the second struts 72b is assisted to be removed from the second wall surface 80b of the second output-side rotary member 70b. Thus, the execution of the dither control facilitates the switching of the two-way clutch TWC from the lock mode to the one-way mode.

After executing the dither control for a given length of time, the dither control portion 134 temporarily suspends the execution of the dither control, and determines whether the two-way clutch TWC has been switched to the one-way mode. Specifically, the dither control portion 134 determines whether the rotational speed difference ΔNtwc (=|Ntwcin−Ntwcout|) between the input rotational speed Ntwcin of the input-side rotary member 68 and the output rotational speed Ntwcout of the output-side rotary members 70 is equal to or larger than the determination threshold value α. When the rotational speed difference ΔNtwc is equal to or larger than the determination threshold value α, it can be determined that the two-way clutch TWC has been switched to the one-way mode. Thus, when the rotational speed difference ΔNtwc becomes not smaller than the determination threshold value α after the execution of the dither control, the dither control portion 134 determines that the two-way clutch TWC has been switched to the one-way mode, and terminates the execution of the dither control. It is noted that the input-side rotary member 68 corresponds to "one of two rotary portions (constituting the two-way clutch)" recited in the appended claims and that the output-side rotary members 70 corresponds to "the other of the two rotary portions" recited in the appended claims.

When the rotational speed difference ΔNtwc is still smaller than the determination threshold value α even after the execution of the dither control, it is determined that the two-way clutch TWC is not yet switched to the one-way mode. In this case, the dither control portion 134 determines whether the shift-up action for switching from the gear running mode (first speed position) to the belt running mode (second speed position) has been completed or not. When it is determined that the shift-up action has been completed, the dither control portion 134 terminates the execution of the dither control. If the dither control is continued to be executed even after the completion of the shift-up action (namely, even after the completion of the switching from the first drive-force transmitting path PT1 to the second drive-force transmitting path PT2), there a risk that the drive force acting on the vehicle 10 could be affected. Therefore, the execution of the dither control is terminated upon the completion of the shift-up action, for restraining uncomfortable feeling given to the vehicle operator. When the shift-up action is still in process, a repeated execution of the dither control provides a possibility that the two-way clutch TWC would be switched to the one-way mode. Therefore, the dither control portion 134 executes the dither control again when a certain length TK of time elapsed from the previous execution of the dither control. Thus, the dither control is executed in a repeated manner until the shift-up action is completed, thereby making it possible to further increase the possibility that the two-way clutch TWC is switched to the one-way mode.

When the shift-up action is completed without the two-way clutch TWC being switched to the one-way mode, the vehicle running is made in the belt running mode with the two-way clutch TWC being placed in the lock mode. In this case, rotation of the drive wheels 14 is transmitted to the first clutch C1 through the two-way clutch TWC, so that there is a possibility that the first clutch C1 could be rotated at a high speed. Therefore, in this case, a control operation for liming the running speed V is executed, for example, by liming the engine torque Te of the engine 12, for thereby restraining the first clutch C1 from being rotated at a high speed.

Figure 5:
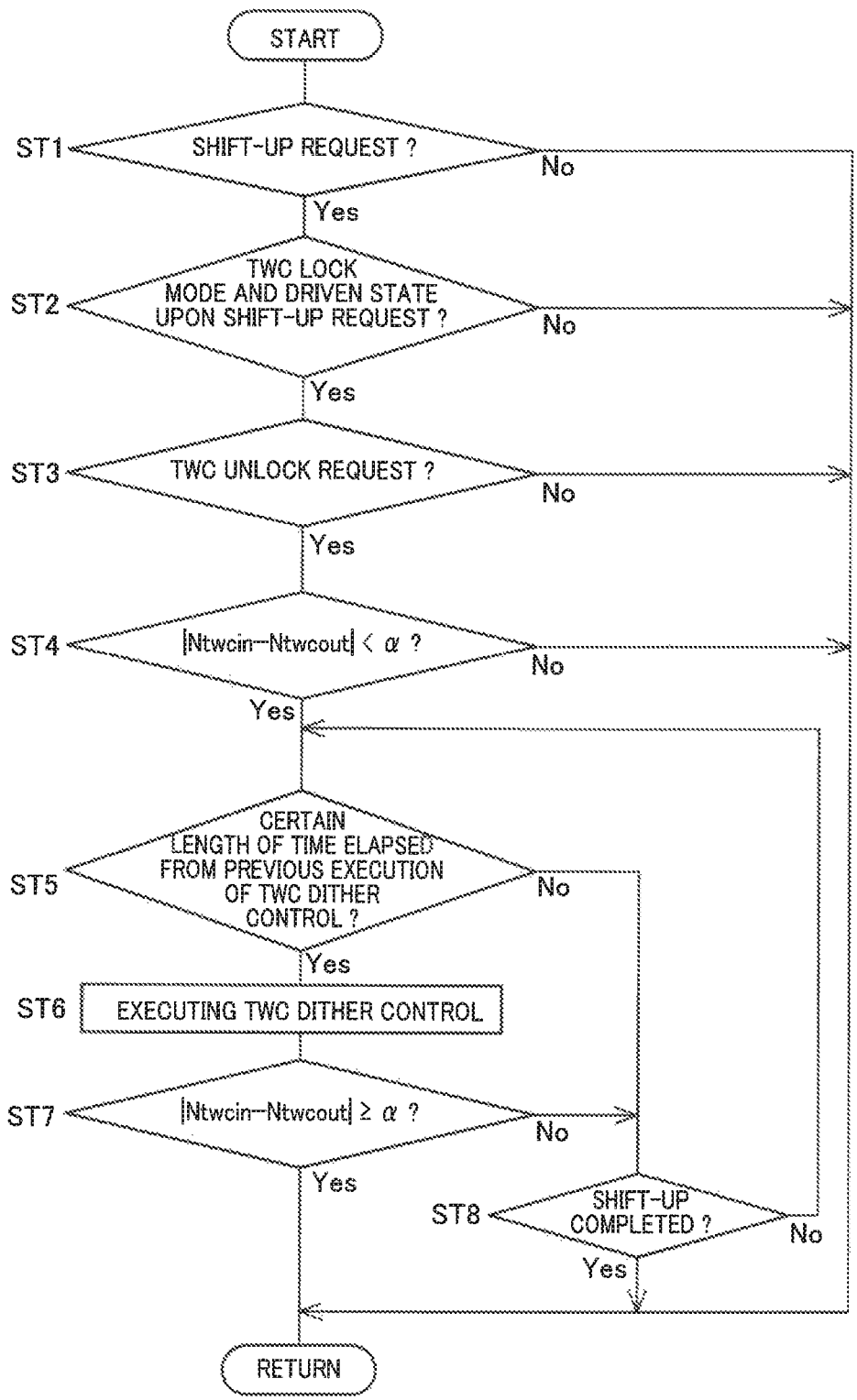
FIG. 5 is a flow chart showing a main part of a control routine executed by the electronic control apparatus shown in FIG. 1, namely, a control routine that is executed for switching the two-way clutch from its lock mode to its one-way mode, by facilitating the two-way clutch to be switched to the one-way mode even in a state in which the two-way clutch is not easily switched to the one-way mode.

FIG. 5 is a flow chart showing a main part of a control routine executed by the electronic control apparatus 100, namely, a control routine that is executed for switching the two-way clutch TWC from the lock mode to the one-way mode, by facilitating the two-way clutch TWC to be switched to the one-way mode even in a state in which the two-way clutch TWC is not easily switched to the one-way mode. This control routine is executed in a repeated manner during the forward running of the vehicle 10.

The control routine is initiated with step ST1 corresponding to control function of the shift-up-request determining portion 126, which is implemented to determine whether the shift-up request for establishing the belt running mode in place of the gear running mode is made or not. When a negative determination is made at step ST1, one cycle of execution of the control routine is completed. When an affirmative determination is made at step ST1, the shift-up action is executed to establish the belt running mode in place of the gear running mode. Then, step ST2 corresponding to control function of the running-state determining portion 128 is implemented to determine whether or not the two-way clutch TWC is placed in the lock mode with the vehicle 10 being in the driven state at a point of time at which the shift-up request is made. When a negative determination is made at step ST2, one cycle of execution of the control routine is completed. When an affirmative determination is made at step ST2, step ST3 corresponding to control function of the unlock-request determining portion 130 is implemented to determine whether the unlock request for switching the two-way clutch TWC to the one-way mode is made or not. When a negative determination is made at step ST3, one cycle of execution of the control routine is completed. When an affirmative determination is made at step ST3, the control for switching the two-way clutch TWC to the one-way mode is executed.

At step ST4 corresponding to control function of the unlock-failure determining portion 132, it is determined whether the unlock failure occurs or not, namely, whether the two-way clutch TWC fails to be switched from the lock mode to the one-way mode or not, depending on whether the rotational speed difference ΔNtwc (=|Ntwcin−Ntwcout|) is smaller than the determination threshold value α or not when the given length tα of time has elapsed from the point of time at which the execution of the control for switching the two-way clutch TWC to the one-way mode was started. When a negative determination is made at step ST4, one cycle of execution of the control routine is completed. When an affirmative determination is made at step ST4, namely, when it is determined that the unlock failure occurs, step ST5 corresponding to control function of the dither control portion 134 is implemented to determine whether or not the certain length TK of time has elapsed from the previous execution of the control operation (such as the dither control) for switching the two-way clutch TWC to the one-way mode. When an affirmative determination is made at step ST5, step ST6 corresponding to control function of the dither control portion 134 is implemented to execute the dither control by which the TWC pressure Ptwc is fluctuated with the above-described period of (T+β). Step ST6 is followed by step ST7 corresponding to control function of the dither control portion 134, which is implemented to temporarily suspend the execution of the dither control and to determine whether the rotational speed difference ΔNtwc becomes equal to or larger than the determination threshold value α or not, namely, whether the two-way clutch TWC has been switched to the one-way mode. When an affirmative determination is made at step ST7, one cycle of execution of the control routine is completed.

When a negative determination is made at step ST5, namely, when the certain length TK of time has not yet elapsed from the previous execution of the control operation (such as the dither control) for switching the two-way clutch TWC to the one-way mode, and when a negative determination is made at step ST7, namely, when the two-way clutch TWC has not been switched to the one-way mode, the control flow goes to step ST8 corresponding to control function of the dither control portion 134, which is implemented to determine whether the shift-up action has been completed or not. When a negative determination is made at step ST8, namely, when the shift-up action is not completed, the control flow goes back of step ST5 so as to execute the dither control again. When an affirmative determination is made at step ST5, namely, when the shift-up action has been completed, the execution of the dither control is terminated. In this case, there is a possibility that the first clutch C1 could be rotated at a high speed due to transmission of rotation from the drive wheels 14 though the first clutch C1 that is still placed in the lock mode. Therefore, in this case, the first clutch C1 is restrained from being rotated at a high speed, for example, by limiting the engine torque Te of the engine 12.

Figure 6:
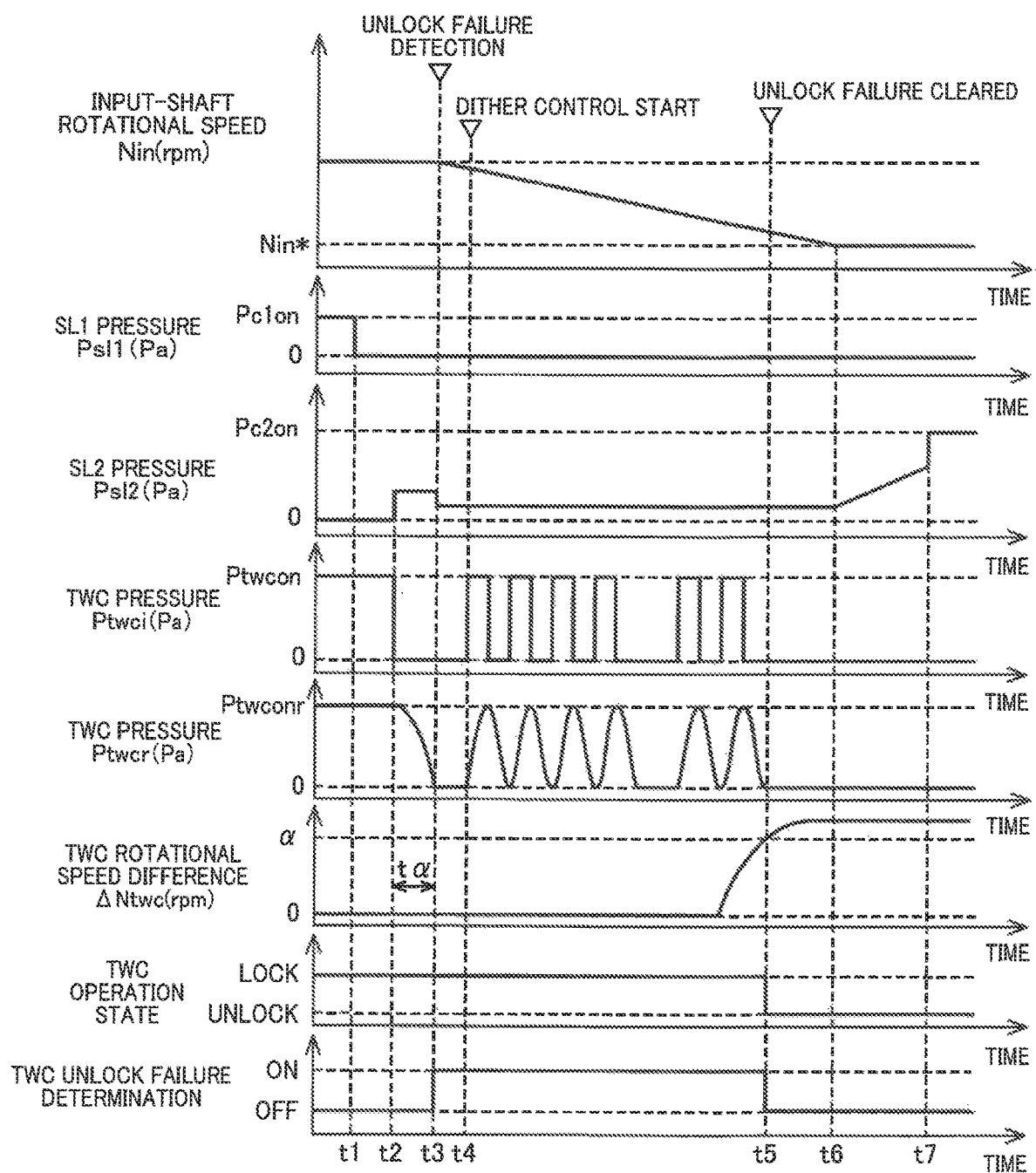
FIG. 6 is a time chart showing a result of the control routine executed through the control functions of the electronic control apparatus shown in FIG. 1, namely, a result of the control routine executed as shown in the flow chart of FIG. 5.

FIG. 6 is a time chart showing a result of the control routine executed through the control functions of the electronic control apparatus 100. Specifically, FIG. 6 shows a result of the control routine that is executed when the operating position POSsh is switched from the position M1 to the position M2 during the forward running with the two-way clutch TWC being placed in the lock mode and with the vehicle 10 being placed in the driven state in which the accelerator pedal 45 being released. In FIG. 6, ordinate axes represent the input-shaft rotational speed Nin of the input shaft 22 (equivalent to the rotational speed NT of the turbine impeller 20t), the SL1 pressure Psl1 (command pressure value) by which the first clutch C1 is controlled, the SL2 pressure Psl2 (command pressure value) by which the second clutch C2 is controlled, the TWC pressure Ptwci (command pressure value) applied to the hydraulic actuator 41 configured to control the switching of the two-way clutch TWC, the TWC pressure Ptwcr (actual pressure value) that follows the TWC pressure Ptwci, the rotational speed difference ΔNtwc, the operation state of the two-way clutch TWC and the determination of the TWC unlock failure, respectively (as seen from top to bottom). In the operation state of the two-way clutch TWC, "LOCK" indicates that the two-way clutch TWC is placed in the lock mode and "UNLOCK" indicates that the two-way clutch TWC is placed in the one-way mode. In the determination of the TWC unlock failure, "OFF" indicates determination that the unlock failure of the two-way clutch TWC does not occur and "ON" indicates determination that the unlock failure of the two-way clutch TWC occurs.

In FIG. 6, at a point t1 of time, the shift-up request for establishing the belt running mode in place of the gear running mode is made as a result of switching of the operating position POSsh from the position M1 to the position M2 during the running in the driven state, and a control for releasing the first clutch C1 is started. Specifically, at the point t1 of time, the SL pressure Psl1 (command pressure value), by which the first clutch C1 is controlled, is controlled to zero. Then, at a point t2 of time, a control for engaging the second clutch C2 is started. Specifically, the SL2 pressure Psl2 is temporarily increased to a certain pressure value, and then is controlled to a stand-by pressure value. Meanwhile, a control for switching the two-way clutch TWC to the one-way mode is started concurrently with the start of engagement of the second clutch C2. Specifically, the TWC pressure Ptwci as the command pressure value is controlled to zero, and the TWC pressure Ptwcr as the actual pressure value is reduced so as to follow the TWC pressure Ptwci.

At a point t3 of time, it is determined that the two-way clutch TWC is placed in the lock mode, and that the unlock failure of the two-way clutch TWC occurs, because the rotational speed difference ΔNtwc is still smaller than the threshold value α although the given length tα of time has elapsed from the point of time at which the execution of the control for switching the two-way clutch TWC to the one-way mode was started.

At a point t4 of time, the dither control for vibrating or fluctuating the TWC pressure Ptwci with a given length of period is started. Specifically, the TWC pressure Ptwci is controlled such that the TWC pressure Ptwci is fluctuated with the above-described period of (T+β) and with an amplitude between zero and a pressure value Ptwcon by which the two-way clutch TWC is to be forced to be placed in the lock mode. Following the thus fluctuated TWC pressure Ptwci as the command pressure value, the TWC pressure Ptwcr as the actual pressure value is vibrated or fluctuated. With the TWC pressure Ptwcr being fluctuated, a periodical force is applied to the second struts 72b of the two-way clutch TWC shown in FIG. 3, so that the longitudinal end portion of each of the second struts 72b is assisted to be removed from the second wall surface 80b of the second output-side rotary member 70b. Then, shortly before a point t5 of time, the contact of each of the second struts 72b with the second wall surface 80b is released whereby the rotational speed difference ΔNtwc is increased. At the point t5 of time, the rotational speed difference ΔNtwc becomes not smaller than the determination threshold value α so that it is determined that the two-way clutch TWC has been switched to the one-way mode and that the unlock failure is cleared.

At a point t6 of time, the input-shaft rotational speed Nin reaches a target rotational speed Nin* that is a target value of the input-shaft rotational speed Nin after the switching to the belt running mode, and the SL2 pressure Psl2 for the second clutch C2 starts to be increased. At a point t7 of time, the SL2 pressure Psl2 reaches a pressure value Pc2on whereby the second clutch C2 is fully engaged so that the establishment of the belt running mode is completed.

In the above-described embodiment, when the request for establishing the second drive-force transmitting path PT2 in place of the first drive-force transmitting path PT1 is made during forward running of the vehicle 10 with the two-way clutch TWC being placed in the lock mode, the dither control is executed for fluctuating the hydraulic pressure applied to the hydraulic actuator 41 by which the switching of the two-way clutch TWC is controlled. Owing to the execution of the dither control, a force, which is periodically changed or fluctuated by the fluctuation of the hydraulic pressure applied to the hydraulic actuator 41, is applied to the two-way clutch TWC, the two-way clutch TWC is facilitated to be switched to the one-way mode. Then, with the two-way clutch TWC being switched from the lock mode to the one-way mode owing to the execution of the dither control, rotation transmitted from the drive wheels 14 is blocked by the two-way clutch TWC after the second drive-force transmitting path PT2 is established. Thus, the rotation is not transmitted from the drive wheels 14 to the first clutch C1 so that it is possible to restrain the first clutch C1 from being rotated at a high speed.

In the above-described embodiment, when it is determined that the two-way clutch TWC is switched from the lock mode to the one-way mode after start of the execution of the dither control, the execution of the dither control is terminated, so that it is possible to avoid a situation in which the dither control is repeatedly executed even after the two-way clutch TWC has been switched to the one-way mode. Further, when the establishment of the second drive-force transmitting path PT2 in place of the first drive-force transmitting path PT1 has been completed, the execution of the dither control is terminated, so that it is possible to avoid change of the drive force of the vehicle 10, which could be caused in a situation in which the dither control is executed continuously even after the second drive-force transmitting path PT2 has been established in place of the first drive-force transmitting path PT1.

While the preferred embodiment of this invention has been described in detail by reference to the drawings, it is to be understood that the invention may be otherwise embodied.

For example, in the above-described embodiment, the two-way clutch TWC is constructed to be placed in a selected one of the one-way mode and the lock mode, such that the two-way clutch TWC transmits the drive force during the driving state of the vehicle 10 in the forward running and such that the two-way clutch TWC transmits the drive force during the driving state of the vehicle 10 in the forward running and during the driven state of the vehicle 10 in the forward running when the two-way clutch TWC is placed in the lock mode. However, the two-way clutch TWC may be constructed to be placed in a selected one of the plurality of operation modes that include, in addition to the one-way mode and the lock mode, a free mode in which the transmission of the drive force is cut off during the driving state of the vehicle 10 and during the driven state of the vehicle 10.

The construction of the two-way clutch TWC is not necessarily limited to the details described above. For example, the two-way clutch may be constituted by first and second one-way clutches that are provided independently of each other, wherein the first one-way clutch is configured to transmit the drive force acting in the forward-running direction of the vehicle 10, and wherein the second one-way clutch is configured to transmit the drive force acting in the reverse-running direction of the vehicle 10, such that the second one-way clutch is switchable to a cut-off mode in which transmission of the drive force acing in the vehicle reverse-running direction through the second one-way clutch is cut off. Further, the first one-way clutch also may be switchable to a cutting-off mode in which transmission of the drive force acing in the vehicle forward-running direction through the first one-way clutch is cut off. That is, the two-way clutch may be modified in construction as needed, as long as the modified two-way clutch can be placed in a selected one of a plurality of operation modes that include at least the one-way mode and the lock mode.

In the above-described embodiment, the determination as to whether the two-way clutch TWC has been switched to the one-way mode or nor is made after execution of the dither control. However, the determination may be made constantly or always concurrently with the execution of the dither control, and the execution of the dither control may be terminated once it is determined that the two-way clutch TWC has been switched to the one-way mode.

In the above-described embodiment, the determination as to whether the unlock failure of the two-way clutch TWC occurs or not is made during the driven state of the vehicle 10. However, the present invention is applicable also to a case in which the unlock failure in a state other than the driven state. There could be a case in the unlock failure of the two-way clutch TWC occurs due to, for example, sticking of components caused by wear and/or inclination of the components. In such a case, too, the execution of the dither control facilitates the two-way clutch TWC to be switched to the one-way mode.

It is to be understood that the embodiment described above is given for illustrative purpose only, and that the present invention may be embodied with various modifications and improvements which may occur to those skilled in the art.

NOMENCLATURE OF ELEMENTS

12: engine
14: drive wheels
16: drive-force transmitting apparatus
24: continuously variable transmission
41: hydraulic actuator
68: input-side rotary member (one of the two rotary portions)
70a, 70b: first and second output-side rotary members (the other of the two rotary portions)
100: electronic control apparatus (control apparatus)
134: dither control portion (control portion)
C1: first clutch
C2: second clutch
TWC: two-way clutch (third clutch)
PT: drive-force transmitting path
PT1: first drive-force transmitting path
PT2: second drive-force transmitting path

What is claimed is:

1. A control apparatus for a drive-force transmitting apparatus that is to be provided in a vehicle having an engine and drive wheels,
wherein the drive-force transmitting apparatus includes a continuously variable transmission, a first clutch, a second clutch and a third clutch, and defines first and second drive-force transmitting paths that are provided in parallel with each other between the engine and the drive wheels, such that the first clutch and the third clutch are provided in the first drive-force transmitting path, and such that the continuously variable transmission and the second clutch are provided in the second drive-force transmitting path,
wherein the first drive-force transmitting path is to be established by engagement of the first clutch and release of the second clutch, such that a drive force is to be transmitted along the first drive-force transmitting path through the first clutch and the third clutch when the first drive-force transmitting path is established,
wherein the second drive-force transmitting path is to be established by release of the first clutch and engagement of the second clutch, such that the drive force is to be transmitted along the second drive-force transmitting path through the continuously variable transmission and the second clutch when the second drive-force transmitting path is established,
wherein the third clutch is a two-way clutch that is to be placed in a selected one of a plurality of operation modes that include at least an one-way mode and a lock mode, such that the two-way clutch is configured to transmit the drive force during a driving state of the vehicle and to cut off transmission of the drive force during a driven state of the vehicle when the two-way clutch is placed in the one-way mode, and such that the two-way clutch is configured to transmit the drive force during the driving state of the vehicle and during the driven state of the vehicle when the two-way clutch is placed in the lock mode,
wherein said control apparatus is configured to switch the two-way clutch from the lock mode to the one-way mode, when the second drive-force transmitting path is to be established in place of the first drive-force transmitting path,
wherein said drive-force transmitting apparatus includes a hydraulic actuator configured to control switching of the two-way clutch between the lock mode and the one-way mode, and
wherein said control apparatus comprises a dither control portion that is configured, when a request for establishing the second drive-force transmitting path in place of the first drive-force transmitting path is made during forward running of the vehicle with the two-way clutch being placed in the lock mode, to execute a dither control for fluctuating a hydraulic pressure applied to the hydraulic actuator by which the switching of the two-way clutch is controlled.

2. The control apparatus according to claim 1,
wherein said dither control portion is configured to terminate execution of the dither control, when it is determined that the two-way clutch is switched from the lock mode to the one-way mode after start of the execution of the dither control.

3. The control apparatus according to claim 1,
wherein said dither control portion is configured to terminate execution of the dither control, when establishment of the drive-force transmitting path in place of the first drive-force transmitting path is completed.

4. The control apparatus according to claim 2,
wherein the two-way clutch includes two rotary portions, which are to be rotated substantially integrally with each other when the drive force is transmitted through the two-way clutch, and
wherein said dither control portion is configured to determine that the two-way clutch is switched from the lock mode to the one-way mode when a rotational speed difference between a rotational speed of one of the two rotary portions and a rotational speed of the other of the two rotary portions is not smaller than a predetermined threshold value.

5. The control apparatus according to claim 1, further comprising:
a running-state determining portion configured to determine that the vehicle is placed in the driven state when a running speed of the vehicle is not lower than a predetermined speed value and an operation amount of an accelerator pedal of the vehicle is not larger than a predetermined amount value.

6. The control apparatus according to claim 1,
wherein the dither control portion is configured to execute the dither control such that the hydraulic pressure applied to the hydraulic actuator is fluctuated with a predetermined period.

7. The control apparatus according to claim 6,
wherein the predetermined period, with which the hydraulic pressure is fluctuated, is dependent on a time constant of the hydraulic pressure, such that the predetermined period is longer as the time constant is larger.

8. The control apparatus according to claim 1,
wherein the two-way clutch includes an input-side rotary portion and an output-side rotary portion such that rotation is to be transmitted between the engine and the input-side rotary portion along the first drive-force transmitting path and such that rotation is to be transmitted between the output-side rotary portion and the drive wheels along the first drive-force transmitting path,
wherein the input-side rotary portion is inhibited from being rotated in a predetermined one of opposite directions relative to the output-side rotary portion and is allowed to be rotated in the other of the opposite directions relative to the output-side rotary portion, when the two-way clutch is placed in the one-way mode, and
wherein the input-side rotary portion is inhibited from being rotated in both of the opposite directions relative to the output-side rotary portion, when the two-way clutch is placed in the lock mode.

9. The control apparatus according to claim 1,
wherein said control apparatus is configured, when the two-way clutch is to be switched from the one-way mode to the lock mode, to cause the hydraulic pressure to be applied to the hydraulic actuator, and is configured, when the two-way clutch is to be switched from the lock mode to the one-way mode, to substantially stop application of the hydraulic pressure to the hydraulic actuator, and
wherein, in event of an unlock failure in which the two-way clutch is not switched from the lock mode to the one-way mode in spite of substantial stop of the application of the hydraulic pressure to the hydraulic actuator, said dither control portion is configured to execute the dither control by which the hydraulic pressure fluctuated with a predetermined period is applied to the hydraulic actuator.

10. The control apparatus according to claim 1,
wherein the two-way clutch is provided between the first clutch and the drive wheels in the first drive-force transmitting path.

* * * * *